(12) United States Patent
Zhou et al.

(10) Patent No.: US 11,748,054 B2
(45) Date of Patent: Sep. 5, 2023

(54) SCREEN PROJECTION METHOD AND TERMINAL DEVICE

(71) Applicant: Huawei Technologies Co., Ltd., Shenzhen (CN)

(72) Inventors: Xingchen Zhou, Nanjing (CN); Tianyu Shao, Nanjing (CN); Ran Ju, Nanjing (CN); Chundong Li, Nanjing (CN); Wei Jin, Nanjing (CN); Wei Ma, Nanjing (CN); Haijun Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/801,005

(22) PCT Filed: Feb. 9, 2021

(86) PCT No.: PCT/CN2021/076126
§ 371 (c)(1),
(2) Date: Aug. 19, 2022

(87) PCT Pub. No.: WO2021/164631
PCT Pub. Date: Aug. 26, 2021

(65) Prior Publication Data
US 2023/0108680 A1    Apr. 6, 2023

(30) Foreign Application Priority Data
Feb. 20, 2020    (CN) .......................... 202010107285.4

(51) Int. Cl.
*G06F 3/14* (2006.01)
*G06F 9/451* (2018.01)
(Continued)

(52) U.S. Cl.
CPC .......... *G06F 3/1454* (2013.01); *G06F 3/0481* (2013.01); *G06F 3/0484* (2013.01);
(Continued)

(58) Field of Classification Search
CPC ...... G06F 3/1454; G06F 9/451; G06F 3/0481; G06F 3/0484; G06T 11/203; G06T 2200/24
See application file for complete search history.

(56) References Cited

U.S. PATENT DOCUMENTS

2012/0290950 A1* 11/2012 Rapaport ................ H04L 51/52
715/753
2015/0046807 A1* 2/2015 Yerli ...................... G06Q 50/01
715/716
(Continued)

FOREIGN PATENT DOCUMENTS

CN        110221798 A    9/2019

*Primary Examiner* — David Phantana-angkool
(74) *Attorney, Agent, or Firm* — SLATER MATSIL, LLP

(57) ABSTRACT

A projection method and a terminal device, including responding, by a transmit end, to a screen projection instruction, obtaining a real-time interface of an application program on which screen projection is to be performed and device information of one or more receive ends, obtaining a user experience score of each receive end of the one or more receive ends by scoring a visual effect, sound effect, and interaction complexity of each receive end based on the device information, obtaining, based on the user experience score, first data on which screen projection is to be performed and that is at least one of a video stream, an audio stream, or a user interface control, obtaining a control layout file of the user interface control in response to the first data having the user interface control, and sending, to a corresponding receive end, the first data and the control layout file.

20 Claims, 13 Drawing Sheets

(51) Int. Cl.
*G06F 3/0481* (2022.01)
*G06F 3/0484* (2022.01)
*G06T 11/20* (2006.01)

(52) U.S. Cl.
CPC ............ *G06F 9/451* (2018.02); *G06T 11/203* (2013.01); *G06T 2200/24* (2013.01)

(56) References Cited

U.S. PATENT DOCUMENTS

| | | | |
|---|---|---|---|
| 2015/0294633 A1* | 10/2015 | Jung | H04L 51/52 345/212 |
| 2016/0274737 A1* | 9/2016 | Partos | G06F 21/316 |
| 2018/0083978 A1* | 3/2018 | Pantazelos | G06V 40/172 |
| 2021/0319408 A1* | 10/2021 | Jorasch | G06Q 10/1095 |
| 2022/0229624 A1 | 7/2022 | Xiong et al. | |

* cited by examiner (a) (b)

(a) (b)

SCREEN PROJECTION METHOD AND TERMINAL DEVICE

CROSS REFERENCE TO RELATED APPLICATIONS

This application is a national stage of international application no. PCT/CN2021/076126, filed on Feb. 9, 2021, which claims priority to Chinese Patent Application No. 202010107285.4, filed on Feb. 20, 2020. Both of the aforementioned applications are hereby incorporated by reference in their entireties.

TECHNICAL FIELD

This application pertains to the field of screen projection technologies, and in particular, to a screen projection method and a terminal device.

BACKGROUND

With advances in science and technology, a quantity of terminal devices owned by a user increases. Screen projection-based sharing between terminal devices has become a daily requirement of the user.

Terminal devices in a screen projection system may be classified into a transmit end and a receive end. To implement the screen projection between terminal devices, in related technologies, the transmit end delivers an entire screen of the transmit end in a mirroring manner to the corresponding receive end, to share screen content of the transmit end. However, in a mirroring screen projection manner of the screen, screen projection is performed on all the screen content of the transmit end for sharing. This manner has a single function and relatively low flexibility, and cannot meet a personalized requirement of the user.

SUMMARY

In view of this, embodiments of this application provide a screen projection method and a terminal device, to resolve a problem of low flexibility of an existing screen projection technology.

A first aspect of an embodiment of this application provides a screen projection method applied to a transmit end and including:

receiving a screen projection instruction, and obtaining a real-time interface of an application program on which screen projection is to be performed and device information of one or more receive ends; obtaining, from the real-time interface based on the device information, first data on which screen projection is to be performed and that corresponds to each receive end; and sending, to the corresponding receive end, the first data on which screen projection is to be performed, so that each receive end outputs the received first data on which screen projection is to be performed, where the first data on which screen projection is to be performed is a video stream, an audio stream, and/or a user interface control.

In this embodiment of this application, the data on which screen projection is to be performed may be obtained based on the device information of the receive end from the real-time interface of the application program on which screen projection is to be performed on the transmit end. In addition, for a single receive end, in this embodiment of this application, flexible selection and screen projection can be implemented for one or more pieces of data on which screen projection is to be performed, to implement adaptive screen projection of each receive end. In this way, the screen projection manner in this embodiment of this application is more flexible, to meet a personalized requirement of the user.

In an embodiment of the first aspect, the method is applied to the transmit end and includes:

responding to the screen projection instruction, and obtaining the real-time interface of the application program on which screen projection is to be performed and the device information of the one or more receive ends; scoring a visual effect, a sound effect, and interaction complexity of each receive end based on the device information, to obtain a user experience score of each receive end; obtaining, from the real-time interface based on the user experience score, the first data on which screen projection is to be performed and that corresponds to each receive end, where the first data on which screen projection is to be performed includes at least one of the video stream, the audio stream, and the user interface control; when the first data on which screen projection is to be performed includes the user interface control, obtaining a control layout file of the user interface control; and sending the first data on which screen projection is to be performed and the control layout file to the corresponding receive end, where the first data on which screen projection is to be performed is used by the receive end for data output, and the control layout file is used by the receive end to generate a display interface that includes the user interface control.

In this embodiment of this application, user experience for the receive end may be evaluated in three dimensions: the visual effect, the sound effect, and the interaction complexity of the receive end, and the data on which screen projection is to be performed may be selected based on the user experience score obtained after the evaluation. Finally, automatic layout can be further implemented for the user interface control. Therefore, in this embodiment of this application, better user experience for screen projection can be implemented, to meet a personalized requirement of the user.

In a first possible implementation of the first aspect, the obtaining, from the real-time interface, first data on which screen projection is to be performed and that corresponds to each receive end specifically includes:

extracting second data on which screen projection is to be performed and that is included in the real-time interface, and selecting, based on the device information from the second data on which screen projection is to be performed, the first data on which screen projection is to be performed and that corresponds to each receive end, where the second data on which screen projection is to be performed includes a video stream, an audio stream, and/or a user interface control.

In this embodiment of this application, the data on which screen projection is to be performed is selected based on the device information of the receive end, so that the content of the final data on which screen projection is performed can be more suitable for an actual device status of the receive end. In this way, the final content on which screen projection is performed can be more suitable for display by the receive end, to improve efficiency of man-machine interaction for the user and improve user experience.

In an embodiment of the first aspect, the obtaining, from the real-time interface based on the user experience score, the first data on which screen projection is to be performed and that corresponds to each receive end specifically includes:

extracting the second data on which screen projection is to be performed and that is included in the real-time interface, where the second data on which screen projection is to be performed includes at least one of the video stream, the audio stream, and the user interface control; and selecting, based on the user experience score from the second data on which screen projection is to be performed, the first data on which screen projection is to be performed and that corresponds to each receive end.

In this embodiment of this application, the data on which screen projection is to be performed is selected based on the device information of the receive end, and different data on which screen projection is to be performed is delivered to different receive ends, so that the content of the final data on which screen projection is performed can be more suitable for an actual device status of the receive end. In this way, the final content on which screen projection is performed can be more suitable for display by the receive end, to improve efficiency of man-machine interaction for the user and improve user experience.

With reference to the first possible implementation, in a possible implementation of the first aspect of this application, the device information includes: a size of a display, and a distortion degree and a frequency response of an audio output.

The operation of selecting, based on the device information from the second data on which screen projection is to be performed, the first data on which screen projection is to be performed and that corresponds to each receive end specifically includes:

processing each piece of second data on which screen projection is to be performed, to obtain a corresponding data interaction score, and performing matching between the user experience score and the data interaction score of each piece of second data on which screen projection is to be performed, to obtain the first data on which screen projection is to be performed and that corresponds to each receive end; or calculating the corresponding user experience score based on the size of the display of each receive end, and the distortion degree and the frequency response of the audio output, processing each piece of second data on which screen projection is to be performed, to obtain a corresponding data interaction score, and performing matching between the user experience score and the data interaction score of each piece of second data on which screen projection is to be performed, to obtain the first data on which screen projection is to be performed and that corresponds to each receive end.

In this embodiment of this application, matching is performed, based on the size of the screen of the receive end and audio output quality, on the data on which screen projection is to be performed, thereby ensuring final user experience of the receive end.

In a second possible implementation of the first aspect, the method includes:

before the sending, to the corresponding receive end, the first data on which screen projection is to be performed, if the first data on which screen projection is to be performed includes the user interface control, first performing, based on the device information, typesetting processing on the user interface control in the first data on which screen projection is to be performed, to obtain a corresponding control layout file.

Correspondingly, the operation of sending, to the corresponding receive end, the first data on which screen projection is to be performed, so that each receive end outputs the received first data on which screen projection is to be performed specifically includes:

sending the first data on which screen projection is to be performed and the control layout file to the corresponding receive end, so that the receive end generates a corresponding display interface based on the received first data on which screen projection is to be performed and the received control layout file.

In this embodiment of this application, typesetting is performed on the user interface control in the data on which screen projection is to be performed, to ensure a display effect of the user interface control in the display interface of the receive end and ensure efficiency of man-machine interaction between the user and the receive end. In addition, an application brand feature may also be maintained to a greatest extent based on division, typesetting, and rearrangement of the user interface control. It is convenient for the user to be quickly familiar with the display interface of the receive end, to facilitate a man-machine interaction operation of the user at the receive end.

With reference to the second possible implementation, in a third possible implementation of the first aspect, the method includes:

before the sending the control layout file to the corresponding receive end, obtaining a drawing instruction and layer data corresponding to each user interface control in the first data on which screen projection is to be performed, where the drawing instruction is used to enable the receive end to draw the user interface control.

Correspondingly, the operation of sending the first data on which screen projection is to be performed and the control layout file to the corresponding receive end, so that the receive end generates a corresponding display interface based on the received first data on which screen projection is to be performed and the received control layout file includes:

sending the drawing instruction, the layer data, and the control layout file to the corresponding receive end, so that the receive end draws the corresponding user interface control based on the drawing instruction, the layer data, and the control layout file.

In this embodiment of this application, the drawing instruction and the layer data are sent to the receive end, so that the receive end can precisely draw the user interface control, thereby ensuring precision and reliability of the finally generated user interface control.

With reference to any one of the first possible implementation to the third possible implementation, in a fourth possible implementation of the first aspect, the method includes:

before the operation of obtaining a real-time interface of an application program on which screen projection is to be performed and device information of one or more receive ends, the method further includes: obtaining a selection instruction input by the user, and obtaining, based on the selection instruction, one or more application programs on which screen projection is to be performed.

In this embodiment of this application, the user may flexibly select, according to an actual requirement of the user, an application program on which screen projection is to be performed, so that a screen projection function is richer and more flexible.

With reference to the first possible implementation, in a fifth possible implementation of the first aspect, the operation of extracting second data on which screen projection is to be performed and that is included in the real-time interface specifically includes:

obtaining the real-time interface of the application program on which screen projection is to be performed, and identifying whether the real-time interface is a preset interface; and if the real-time interface is the preset interface, extracting the second data on which screen projection is to be performed and that is included in the real-time interface.

In this embodiment of this application, the foregoing operation of extracting the data on which screen projection is to be performed is performed only when the real-time interface is the preset basic interface, to avoid an impact of an excessively large quantity of display interfaces on normal use of the screen projection function by the user.

With reference to the first possible implementation, in a sixth possible implementation of the first aspect, the operation of selecting, based on the device information from the second data on which screen projection is to be performed, the first data on which screen projection is to be performed and that corresponds to each receive end includes:

dividing the video stream and the user interface control in the second data on which screen projection is to be performed into one or more data sets on which screen projection is to be performed, where each data set on which screen projection is to be performed is not an empty set, and no intersection set exists between the data sets on which screen projection is to be performed; and performing, based on the device information of the receive end, matching on each data set on which screen projection is to be performed, and using, as the first data on which screen projection is to be performed and that corresponds to the receive end, the second data on which screen projection is to be performed and that is included in the successfully matching data set on which screen projection is to be performed.

In this embodiment of this application, the data on which screen projection is to be performed and that needs to be displayed is first combined in different manners. On this basis, matching is performed on the device information of the receive end. Display data of various different receive-end devices may be adaptively matched, to implement better compatibility for the receive end in this embodiment of this application. In addition, data content included in each data set on which screen projection is to be performed may be preset, to implement a better screen projection effect and a more flexible function in this embodiment of this application.

With reference to the second possible implementation or the third possible implementation, in a seventh possible implementation of the first aspect, the operation of performing typesetting on the user interface control specifically includes:

obtaining size information of the real-time interface and position information and size information of the user interface control in the real-time interface in the second data on which screen projection is to be performed, and drawing, based on the size information of the real-time interface and the position information and the size information of the user interface control in the real-time interface, a distribution diagram corresponding to the user interface control in the real-time interface;

identifying a first typesetting type corresponding to the distribution diagram, and determining, based on the device information, a second typesetting type corresponding to the first typesetting type; and obtaining, based on the second typesetting type, relative position information and relative size information corresponding to each user interface control in the display interface in the second data on which screen projection is to be performed, and generating the control layout file based on the relative position information and the relative size information.

In this embodiment of this application, a proper layout style is correspondingly selected in advance for the user interface control in man-machine interaction of each type of receive end. Then, a proper layout style of the receive end is determined based on the layout style of the user interface control in the real-time interface. Finally, the corresponding control layout file is generated based on the proper layout style of the receive end. In this way, a final presentation manner of the user interface control in the display interface of the receive end is ensured, and requirements of different receive ends for man-machine interaction can be further met, to improve efficiency of man-machine interaction.

With reference to any one of the first possible implementation to the seventh possible implementation, in an eighth possible implementation of the first aspect, the method includes:

receiving second coordinate information and an event type that are sent by the receive end, and executing a corresponding event task based on the second coordinate information and the event type, where the event type is obtained through type identification performed on an operation event by the receive end after the operation event is detected, and the second coordinate information is obtained through coordinate conversion processing performed on first coordinate information after the receive end obtains the first coordinate information of the operation event on a screen of the receive end.

In this embodiment of this application, the receive end converts the coordinate information and identifies the event type, and the transmit end executes the corresponding event task based on the converted coordinate information and the event type, to implement reverse control of the receive end to the transmit end. The user can also implement an operation on the transmit end without contacting the transmit end in a screen projection process. In this way, efficiency of man-machine interaction between the user and the transmit end is greatly improved, and a screen projection function is richer and more flexible.

With reference to the first possible implementation, in a ninth possible implementation of the first aspect, the operation of performing matching on the first data on which screen projection is to be performed specifically includes:

dividing the video stream and the user interface control included in the real-time interface into one or more data sets, where each data set includes a video stream or at least one user interface control, and no intersection set exists between the data sets;

calculating a user experience score for each data set to obtain a corresponding set experience score, calculating a user experience score for the device information of the receive end to obtain a corresponding device experience score, and performing matching between the set experience score and the device experience score to determine m data sets corresponding to the receive end, where m is a natural number; and calculating a user experience score for the audio stream to obtain a corresponding audio experience score, performing matching between the audio experience score and the device experience score, and if the matching succeeds, determining that the audio stream is the first data on which screen projection is to be performed and that corresponds to the application on which screen projection is to be performed.

In this embodiment of this application, the data on which screen projection is to be performed and that needs to be displayed is first divided into data sets. Then, a data set corresponding to each receive end is selected based on an impact status of each data set on user experience and an impact status of each receive end on user experience. Therefore, the data on which screen projection is to be performed and that is finally displayed on each receive end is data for better user experience, to ensure a final user experience effect.

With reference to the first possible implementation, in a tenth possible implementation of the first aspect, the first data on which screen projection is to be performed further includes to-be-notified data and/or motion sensing data.

In this embodiment of this application, screen projection of more types of user experience design elements can be supported, to implement a better screen projection effect and improve richness and flexibility of the function.

With reference to the first possible implementation, in an eleventh possible implementation of the first aspect, the method includes:

if a display status of a user interface control on which screen projection is performed changes in the real-time interface of the application program on which screen projection is to be performed, the transmit end obtains changing attribute data of the user interface control, and sends the changing attribute data to the corresponding receive end, so that the receive end updates the display status of the user interface control in the display interface based on the received attribute data.

In this embodiment of this application, the display status of the user interface control can be updated in real time, to ensure real-time performance of screen projection.

With reference to the first possible implementation, in a twelfth possible implementation of the first aspect, the method includes:

if a display status of a motion picture on which screen projection is performed changes in the real-time interface of the application program on which screen projection is to be performed, the transmit end obtains new picture data corresponding to the motion picture, and sends the new picture data to the corresponding receive end, so that the receive end updates the display status of the corresponding motion picture after the receive end receives the picture data.

In this embodiment of this application, the display status of the motion picture can be updated in real time, to ensure real-time performance of screen projection.

A second aspect of an embodiment of this application provides a screen projection method applied to a transmit end and including:

receiving a screen projection instruction, and obtaining a real-time interface of an application program on which screen projection is to be performed and device information of one or more receive ends; obtaining, from the real-time interface based on the device information, first data on which screen projection is to be performed and that corresponds to each receive end; if the first data on which screen projection is to be performed includes a user interface control and/or a video stream, generating, based on the first data on which screen projection is to be performed, a display interface corresponding to each receive end, and performing video coding on the display interface to obtain a corresponding real-time video stream; and finally, sending the real-time video stream to the corresponding receive end, so that the receive end decodes and plays the received real-time video stream.

In this embodiment of this application, the data on which screen projection is to be performed may be obtained based on the device information of the receive end from the real-time interface of the application program on which screen projection is to be performed on the transmit end. In addition, for a single receive end, in this embodiment of this application, flexible selection and screen projection can be implemented for one or more pieces of data on which screen projection is to be performed, to implement adaptive screen projection of each receive end. In this way, the screen projection manner in this embodiment of this application is more flexible, to meet a personalized requirement of the user. In addition, the transmit end performs real-time video compositing and transmission on all the data on which screen projection is to be performed, to lower software and hardware requirements on the receive end and implement better compatibility for the receive end.

In a first possible implementation of the second aspect, the obtaining, from the real-time interface, first data on which screen projection is to be performed and that corresponds to each receive end specifically includes:

extracting second data on which screen projection is to be performed and that is included in the real-time interface, and selecting, based on the device information from the second data on which screen projection is to be performed, the first data on which screen projection is to be performed and that corresponds to each receive end, where the second data on which screen projection is to be performed includes a video stream, an audio stream, and/or a user interface control.

In this embodiment of this application, the data on which screen projection is to be performed is selected based on the device information of the receive end, so that the content of the final data on which screen projection is performed can be more suitable for an actual device status of the receive end. In this way, the final content on which screen projection is performed can be more suitable for display by the receive end, to improve efficiency of man-machine interaction for the user and improve user experience.

With reference to the first possible implementation, in a possible implementation of the second aspect of this application, the device information includes: a size of a display, and a distortion degree and a frequency response of an audio output.

The operation of selecting, based on the device information from the second data on which screen projection is to be performed, the first data on which screen projection is to be performed and that corresponds to each receive end specifically includes:

calculating a corresponding user experience score based on the size of the display of each receive end, and the distortion degree and the frequency response of the audio output, processing each piece of second data on which screen projection is to be performed, to obtain a corresponding data interaction score, and performing matching between the user experience score and the data interaction score of each piece of second data on which screen projection is to be performed, to obtain the first data on which screen projection is to be performed and that corresponds to each receive end.

In this embodiment of this application, matching is performed, based on the size of the screen of the receive end and audio output quality, on the data on which screen projection is to be performed, thereby ensuring final user experience of the receive end.

In a second possible implementation of the second aspect, the generating, based on the first data on which screen projection is to be performed, a display interface corresponding to each receive end specifically includes:

if the first data on which screen projection is to be performed includes the user interface control, performing, based on the device information, typesetting processing on the user interface control in the first data on which screen projection is to be performed, to obtain a corresponding control layout file; and generating the corresponding display interface based on the received first data on which screen projection is to be performed and the control layout file.

In this embodiment of this application, typesetting is performed on the user interface control in the data on which screen projection is to be performed, to ensure a display effect of the user interface control in the display interface of the receive end and ensure efficiency of man-machine interaction between the user and the receive end. In addition, an application brand feature may also be maintained to a greatest extent based on division, typesetting, and rearrangement of the user interface control. It is convenient for the user to be quickly familiar with the display interface of the receive end, to facilitate a man-machine interaction operation of the user at the receive end.

With reference to the second possible implementation, in a third possible implementation of the second aspect, the generating, based on the first data on which screen projection is to be performed, a display interface corresponding to each receive end includes:

obtaining a drawing instruction and layer data corresponding to each user interface control in the first data on which screen projection is to be performed, where the drawing instruction is used to enable the receive end to draw the user interface control.

Correspondingly, the generating the corresponding display interface based on the received first data on which screen projection is to be performed and the control layout file includes:

drawing the corresponding user interface control based on the drawing instruction, the layer data, and the control layout file, and generating the display interface based on the drawn user interface control.

In this embodiment of this application, the drawing instruction and the layer data are obtained, so that the transmit end can precisely draw the user interface control, thereby ensuring precision and reliability of the finally generated user interface control.

With reference to any one of the first possible implementation to the third possible implementation, in a fourth possible implementation of the second aspect, the method includes:

before the operation of obtaining a real-time interface of an application program on which screen projection is to be performed, the method further includes: obtaining a selection instruction input by the user, and obtaining, based on the selection instruction, one or more application programs on which screen projection is to be performed.

In this embodiment of this application, the user may flexibly select, according to an actual requirement of the user, an application program on which screen projection is to be performed, so that a screen projection function is richer and more flexible.

With reference to the first possible implementation, in a fifth possible implementation of the second aspect, the operation of extracting second data on which screen projection is to be performed and that is included in the real-time interface specifically includes:

obtaining a real-time interface of an application program on which screen projection is to be performed, and identifying whether the real-time interface is a preset interface; and if the real-time interface is the preset interface, extracting the second data on which screen projection is to be performed and that is included in the real-time interface.

In this embodiment of this application, the foregoing operation of extracting the data on which screen projection is to be performed is performed only when the real-time interface is the preset basic interface, to avoid an impact of an excessively large quantity of display interfaces on normal use of the screen projection function by the user.

With reference to the first possible implementation, in a sixth possible implementation of the second aspect, the operation of selecting, based on the device information from the second data on which screen projection is to be performed, the first data on which screen projection is to be performed and that corresponds to each receive end includes:

dividing the video stream and the user interface control in the second data on which screen projection is to be performed into one or more data sets on which screen projection is to be performed, where each data set on which screen projection is to be performed is not an empty set, and no intersection set exists between the data sets on which screen projection is to be performed; and performing, based on the device information of the receive end, matching on each data set on which screen projection is to be performed, and using, as the first data on which screen projection is to be performed and that corresponds to the receive end, the second data on which screen projection is to be performed and that is included in the successfully matching data set on which screen projection is to be performed.

In this embodiment of this application, the data on which screen projection is to be performed and that needs to be displayed is first combined in different manners. On this basis, matching is performed on the device information of the receive end. Display data of various different receive-end devices may be adaptively matched, to implement better compatibility for the receive end in this embodiment of this application. In addition, data content included in each data set on which screen projection is to be performed may be preset, to implement a better screen projection effect and a more flexible function in this embodiment of this application.

With reference to the second possible implementation or the third possible implementation, in a seventh possible implementation of the second aspect, the operation of performing typesetting on the user interface control specifically includes:

obtaining size information of the real-time interface and position information and size information of the user interface control in the real-time interface in the second data on which screen projection is to be performed, and drawing, based on the size information of the real-time interface and the position information and the size information of the user interface control in the real-time interface, a distribution diagram corresponding to the user interface control in the real-time interface;

identifying a first typesetting type corresponding to the distribution diagram, and determining, based on the device information, a second typesetting type corresponding to the first typesetting type; and obtaining, based on the second typesetting type, relative position information and relative size information corresponding to each user interface control in the display interface in the second data on which screen projection is to be performed, and generating the control layout file based on the relative position information and the relative size information.

In this embodiment of this application, a proper layout style is correspondingly selected in advance for a user interface control in man-machine interaction of each type of receive end. Then, a proper layout style of the receive end is determined based on the layout style of the user interface control in the real-time interface. Finally, the corresponding control layout file is generated based on the proper layout style of the receive end. In this way, a final presentation manner of the user interface control in the display interface of the receive end is ensured, and requirements of different receive ends for man-machine interaction can be further met, to improve efficiency of man-machine interaction.

With reference to any one of the first possible implementation to the seventh possible implementation, in an eighth possible implementation of the second aspect, the method includes:

receiving second coordinate information and an event type that are sent by the receive end, and executing a corresponding event task based on the second coordinate information and the event type, where the event type is obtained through type identification performed on an operation event by the receive end after the operation event is detected, and the second coordinate information is obtained through coordinate conversion processing performed on first coordinate information after the receive end obtains the first coordinate information of the operation event on a screen of the receive end.

In this embodiment of this application, the receive end converts the coordinate information and identifies the event type, and the transmit end executes a corresponding event task based on the converted coordinate information and the event type, to implement reverse control of the receive end to the transmit end. The user can also implement an operation on the transmit end without contacting the transmit end in a screen projection process. In this way, efficiency of man-machine interaction between the user and the transmit end is greatly improved, and a screen projection function is richer and more flexible.

With reference to the first possible implementation, in a ninth possible implementation of the second aspect, the operation of performing matching on the first data on which screen projection is to be performed specifically includes:

dividing the video stream and the user interface control included in the real-time interface into one or more data sets, where each data set includes a video stream or at least one user interface control, and no intersection set exists between the data sets;

calculating a user experience score for each data set to obtain a corresponding set experience score, calculating a user experience score for the device information of the receive end to obtain a corresponding device experience score, and performing matching between the set experience score and the device experience score to determine m data sets corresponding to the receive end, where m is a natural number; and calculating a user experience score for the audio stream to obtain a corresponding audio experience score, performing matching between the audio experience score and the device experience score, and if the matching succeeds, determining that the audio stream is the first data on which screen projection is to be performed and that corresponds to the application on which screen projection is to be performed.

In this embodiment of this application, the data on which screen projection is to be performed and that needs to be displayed is first divided into sets. Then, a data set corresponding to each receive end is selected based on an impact status of each data set on user experience and an impact status of each receive end on user experience. Therefore, the data on which screen projection is to be performed and that is finally displayed on each receive end is data for better user experience, to ensure a final user experience effect.

With reference to the first possible implementation, in a tenth possible implementation of the second aspect, the first data on which screen projection is to be performed further includes to-be-notified data and/or motion sensing data.

In this embodiment of this application, screen projection of more types of user experience design elements can be supported, to implement a better screen projection effect and improve richness and flexibility of the function.

With reference to the first possible implementation, in an eleventh possible implementation of the second aspect, the method includes:

if a display status of a user interface control on which screen projection is performed changes in the real-time interface of the application program on which screen projection is to be performed, the transmit end obtains changing attribute data of the user interface control, and updates a corresponding real-time video stream based on the changing attribute data.

In this embodiment of this application, the display status of the user interface control can be updated in real time, to ensure real-time performance of screen projection.

With reference to the first possible implementation, in a twelfth possible implementation of the second aspect, the method includes:

if a display status of a motion picture on which screen projection is performed changes in the real-time interface of the application program on which screen projection is to be performed, the transmit end obtains new picture data corresponding to the motion picture, and updates the corresponding real-time video stream based on the obtained picture data, where in this embodiment of this application, the display status of the motion picture can be updated in real time, to ensure real-time performance of screen projection.

A third aspect of an embodiment of this application provides a screen projection method applied to a receive end and including:

receiving first data on which screen projection is to be performed and that is sent by a transmit end, where the first data on which screen projection is to be performed is selected by the transmit end based on device information of the receive end from second data on which screen projection is to be performed, after the transmit end obtains a real-time interface of an application program on which screen projection is to be performed and extracts the second data on which screen projection is to be performed and that is included in the real-time interface, and the second data on which screen projection is to be performed includes a video stream, an audio stream, and/or a user interface control;

performing, based on the device information, typesetting processing on the user interface control in the first data on which screen projection is to be performed, to obtain a corresponding control layout file; and generating a corresponding display interface based on the first data on which screen projection is to be performed and the obtained control layout file.

In this embodiment of this application, after receiving the data on which screen projection is to be performed and that is selected by the transmit end, the receive end performs typesetting on the user interface control of the receive end based on the device information of the receive end, and then generates the corresponding display interface based on a typesetting result. In this way, in this embodiment of this application, a display effect of the user interface control in a display interface of the receive end can be ensured, to ensure efficiency of man-machine interaction between the user and the receive end. In addition, an application brand feature may also be maintained to a greatest extent based on division, typesetting, and rearrangement of the user interface control. It is convenient for the user to be quickly familiar with the display interface of the receive end, to facilitate a man-machine interaction operation of the user at the receive end.

In a first possible implementation of the third aspect, the operation of performing typesetting on the user interface control specifically includes:

obtaining size information of the real-time interface and position information and size information of the user interface control in the real-time interface in the second data on which screen projection is to be performed, and drawing, based on the size information of the real-time interface and the position information and the size information of the user interface control in the real-time interface, a distribution diagram corresponding to the user interface control in the real-time interface;

identifying a first typesetting type corresponding to the distribution diagram, and determining, based on the device information, a second typesetting type corresponding to the first typesetting type; and obtaining, based on the second typesetting type, relative position information and relative size information corresponding to each user interface control in the display interface in the second data on which screen projection is to be performed, and generating the control layout file based on the relative position information and the relative size information.

In this embodiment of this application, a proper layout style is correspondingly selected in advance for a user interface control in man-machine interaction of each type of receive end. Then, a proper layout style of the receive end is determined based on the layout style of the user interface control in the real-time interface. Finally, the corresponding control layout file is generated based on the proper layout style of the receive end. In this way, a final presentation manner of the user interface control in the display interface of the receive end is ensured, and requirements of different receive ends for man-machine interaction can be further met, to improve efficiency of man-machine interaction.

A fourth aspect of an embodiment of this application provides a screen projection system that includes a transmit end and one or more receive ends.

The transmit end receives a screen projection instruction, obtains a real-time interface of an application program on which screen projection is to be performed and device information of one or more receive ends, and obtains, from the real-time interface based on the device information, first data on which screen projection is to be performed and that corresponds to each receive end. The first data on which screen projection is to be performed is a video stream, an audio stream, and/or a user interface control.

The transmit end sends, to the corresponding receive end, the first data on which screen projection is to be performed.

The receive end outputs the received first data on which screen projection is to be performed.

In this embodiment of this application, the data on which screen projection is to be performed may be obtained based on the device information of the receive end from the real-time interface of the application program on which screen projection is to be performed on the transmit end. In addition, for a single receive end, in this embodiment of this application, flexible selection and screen projection can be implemented for one or more pieces of data on which screen projection is to be performed, to implement adaptive screen projection of each receive end. In this way, the screen projection manner in this embodiment of this application is more flexible, to meet a personalized requirement of the user.

In a first possible implementation of the fourth aspect, that the transmit end obtains, from the real-time interface, the first data on which screen projection is to be performed and that corresponds to each receive end specifically includes:

extracting second data on which screen projection is to be performed and that is included in the real-time interface, and selecting, based on the device information from the second data on which screen projection is to be performed, the first data on which screen projection is to be performed and that corresponds to each receive end, where the second data on which screen projection is to be performed includes a video stream, an audio stream, and/or a user interface control.

In this embodiment of this application, the transmit end selects, based on the device information of the receive end, the data on which screen projection is to be performed, so that the content of the final data on which screen projection is performed can be more suitable for an actual device status of the receive end. In this way, the final content on which screen projection is performed can be more suitable for display by the receive end, to improve efficiency of man-machine interaction for the user and improve user experience.

With reference to the first possible implementation, in a possible implementation of the fourth aspect of this application, the device information includes: a size of a display, and a distortion degree and a frequency response of an audio output.

That the transmit end selects, based on the device information from the second data on which screen projection is to be performed, the first data on which screen projection is to be performed and that corresponds to each receive end specifically includes:

calculating a corresponding user experience score based on the size of the display of each receive end, and the distortion degree and the frequency response of the audio output, processing each piece of second data on which screen projection is to be performed, to obtain a corresponding data interaction score, and performing matching between the user experience score and the data interaction score of each piece of second data on which screen projection is to be performed to obtain the first data on which screen projection is to be performed and that corresponds to each receive end.

In this embodiment of this application, matching is performed, based on the size of the screen of the receive end and audio output quality, on the data on which screen projection is to be performed, thereby ensuring final user experience of the receive end.

In a second possible implementation of the fourth aspect, the following is included:

before sending, to the corresponding receive end, the first data on which screen projection is to be performed, the receive end first performs, based on the device information, typesetting processing on the user interface control in the first data on which screen projection is to be performed, to obtain a corresponding control layout file.

Correspondingly, the operation that the transmit end sends, to the corresponding receive end, the first data on which screen projection is to be performed specifically includes:

the transmit end sends the first data on which screen projection is to be performed and the control layout file to the corresponding receive end.

Correspondingly, an operation that the receive end generates a display interface specifically includes:

the receive end generates the corresponding display interface based on the received first data on which screen projection is to be performed and the received control layout file.

In this embodiment of this application, typesetting is performed on the user interface control in the data on which screen projection is to be performed, to ensure a display effect of the user interface control in the display interface of the receive end and ensure efficiency of man-machine interaction between the user and the receive end. In addition, an application brand feature may also be maintained to a greatest extent based on division, typesetting, and rearrangement of the user interface control. It is convenient for the user to be quickly familiar with the display interface of the receive end, to facilitate a man-machine interaction operation of the user at the receive end.

In a third possible implementation of the fourth aspect, the operation that the receive end generates, based on the received first data on which screen projection is to be performed, the corresponding display interface specifically includes:

the receive end performs, based on the device information, typesetting processing on the user interface control in the first data on which screen projection is to be performed, to obtain the corresponding control layout file; and the receive end generates the corresponding display interface based on the first data on which screen projection is to be performed and the obtained control layout file.

In this embodiment of this application, after receiving the data on which screen projection is to be performed and that is selected by the transmit end, the receive end performs typesetting on the user interface control of the receive end based on the device information of the receive end, and then generates the corresponding display interface based on a typesetting result. In this way, in this embodiment of this application, a display effect of the user interface control in a display interface of the receive end can be ensured, to ensure efficiency of man-machine interaction between the user and the receive end. In addition, an application brand feature may also be maintained to a greatest extent based on division, typesetting, and rearrangement of the user interface control.

With reference to the second possible implementation, in a fourth possible implementation of the fourth aspect, the following is included:

before the transmit end sends the control layout file to the corresponding receive end, the transmit end obtains a drawing instruction and layer data corresponding to each user interface control in the first data on which screen projection is to be performed, where the drawing instruction is used to enable the receive end to draw the user interface control.

Correspondingly, the operation that the transmit end sends the first data on which screen projection is to be performed and the control layout file to the corresponding receive end, so that the receive end generates the corresponding display interface based on the received first data on which screen projection is to be performed and the received control layout file includes:

the transmit end sends the drawing instruction, the layer data, and the control layout file to the corresponding receive end.

Correspondingly, the operation that the receive end generates the display interface specifically includes:

the receive end draws a corresponding user interface control based on the drawing instruction, the layer data, and the control layout file, and generates the display interface based on the drawn user interface control.

In this embodiment of this application, the drawing instruction and the layer data are sent to the receive end, so that the receive end can precisely draw the user interface control, thereby ensuring precision and reliability of the finally generated user interface control.

With reference to any one of the first possible implementation to the fourth possible implementation, in a fifth possible implementation of the fourth aspect, the following is included:

before the operation that the transmit end obtains the real-time interface of the application program on which screen projection is to be performed and the device information of the one or more receive ends, the following is further included: obtaining a selection instruction input by the user, and obtaining, based on the selection instruction, one or more application programs on which screen projection is to be performed.

In this embodiment of this application, the user may flexibly select, according to an actual requirement of the user, an application program on which screen projection is to be performed, so that a screen projection function is richer and more flexible.

With reference to the first possible implementation, in a sixth possible implementation of the fourth aspect, the operation that the transmit end extracts second data on which screen projection is to be performed and that is included in the real-time interface specifically includes:

the transmit end obtains the real-time interface of the application program on which screen projection is to be performed, and identifies whether the real-time interface is a preset interface; and if the real-time interface is the preset interface, the transmit end extracts the second data on which screen projection is to be performed and that is included in the real-time interface.

In this embodiment of this application, the foregoing operation of extracting the data on which screen projection is to be performed is performed only when the real-time interface is the preset basic interface, to avoid an impact of an excessively large quantity of display interfaces on normal use of the screen projection function by the user.

With reference to the first possible implementation, in a seventh possible implementation of the fourth aspect, the operation that the transmit end selects, based on the device information from the second data on which screen projection is to be performed, the first data on which screen projection is to be performed and that corresponds to each receive end includes:

the transmit end divides the video stream and the user interface control in the second data on which screen projection is to be performed into one or more data sets on which screen projection is to be performed, where each data set on which screen projection is to be performed is not an empty set, and no intersection set exists between the data sets on which screen projection is to be performed; and the transmit end performs, based on the device information of the receive end, matching on each data set on which screen projection is to be performed, and uses, as the first data on which screen projection is to be performed and that corresponds to the receive end, the second data on which screen projection is to be performed and that is included in the successfully matching data set on which screen projection is to be performed.

In this embodiment of this application, the data on which screen projection is to be performed and that needs to be displayed is first combined in different manners. On this basis, matching is performed on the device information of the receive end. Display data of various different receive-end devices may be adaptively matched, to implement better compatibility for the receive end in this embodiment of this application. In addition, data content included in each data set on which screen projection is to be performed may be preset, to implement a better screen projection effect and a more flexible function in this embodiment of this application.

With reference to the second possible implementation or the third possible implementation, in an eighth possible implementation of the fourth aspect, the operation that the transmit end or the receive end performs typesetting on the user interface control specifically includes:

obtaining size information of the real-time interface and position information and size information of the user interface control in the real-time interface in the second data on which screen projection is to be performed, and drawing, based on the size information of the real-time interface and the position information and the size information of the user interface control in the real-time interface, a distribution diagram corresponding to the user interface control in the real-time interface;

identifying a first typesetting type corresponding to the distribution diagram, and determining, based on the device information, a second typesetting type corresponding to the first typesetting type; and obtaining, based on the second typesetting type, relative position information and relative size information corresponding to each user interface control in the display interface in the second data on which screen projection is to be performed, and generating the control layout file based on the relative position information and the relative size information.

In this embodiment of this application, a proper layout style is correspondingly selected in advance for a user interface control in man-machine interaction of each type of receive end. Then, a proper layout style of the receive end is determined based on the layout style of the user interface control in the real-time interface. Finally, the corresponding control layout file is generated based on the proper layout style of the receive end. In this way, a final presentation manner of the user interface control in the display interface of the receive end is ensured, and requirements of different receive ends for man-machine interaction can be further met, to improve efficiency of man-machine interaction.

With reference to any one of the first possible implementation to the seventh possible implementation, in a ninth possible implementation of the fourth aspect, the following is included:

after detecting an operation event, the receive end identifies an event type of the operation event, and obtains first coordinate information of the operation event on a screen of the receive end;

the receive end performs coordinate conversion processing on the first coordinate information to obtain corresponding second coordinate information;

the receive end sends the second coordinate information and the event type to the transmit end; and the transmit end receives the second coordinate information and the event type, and executes a corresponding event task based on the second coordinate information and the event type.

In this embodiment of this application, the receive end converts the coordinate information and identifies the event type, and the transmit end executes the corresponding event task based on the converted coordinate information and the event type, to implement reverse control of the receive end to the transmit end. The user can also implement an operation on the transmit end without contacting the transmit end in a screen projection process. In this way, efficiency of man-machine interaction between the user and the transmit end is greatly improved, and a screen projection function is richer and more flexible.

With reference to the first possible implementation, in a tenth possible implementation of the fourth aspect, the operation that the transmit end performs matching on the first data on which screen projection is to be performed specifically includes:

the transmit end divides the video stream and the user interface control included in the real-time interface into one or more data sets, where each data set includes a video stream or at least one user interface control, and no intersection set exists between the data sets;

the transmit end calculates a user experience score for each data set to obtain a corresponding set experience score, calculates a user experience score for the device information of the receive end to obtain a corresponding device experience score, and performs matching between the set experience score and the device experience score to determine m data sets corresponding to the receive end, where m is a natural number; and the transmit end calculates a user experience score for the audio stream to obtain a corresponding audio experience score, performs matching between the audio experience score and the device experience score, and if the matching succeeds, determines that the audio stream is the first data on which screen projection is to be performed and that corresponds to the application on which screen projection is to be performed.

In this embodiment of this application, the data on which screen projection is to be performed and that needs to be displayed is first divided into sets. Then, a data set corresponding to each receive end is selected based on an impact status of each data set on user experience and an impact status of each receive end on user experience. Therefore, the data on which screen projection is to be performed and that is finally displayed on each receive end is data for better user experience, to ensure a final user experience effect.

With reference to the first possible implementation, in an eleventh possible implementation of the fourth aspect, the first data on which screen projection is to be performed further includes to-be-notified data and/or motion sensing data.

In this embodiment of this application, screen projection of more types of user experience design data can be supported, to implement a better screen projection effect and improve richness and flexibility of the function.

With reference to the first possible implementation, in a twelfth possible implementation of the fourth aspect, the following is included:

if a display status of a user interface control on which screen projection is performed changes in the real-time interface of the application program on which screen projection is to be performed, the transmit end obtains changing attribute data of the user interface control, and sends the changing attribute data to the corresponding receive end; and the receive end updates the display status of the user interface control in the display interface based on the received attribute data.

In this embodiment of this application, the display status of the user interface control can be updated in real time, to ensure real-time performance of screen projection.

With reference to the first possible implementation, in a thirteenth possible implementation of the fourth aspect, the following is included:

if a display status of a motion picture on which screen projection is performed changes in the real-time interface of the application program on which screen projection is to be performed, the transmit end obtains new picture data corresponding to the motion picture, and sends the new picture data to the corresponding receive end; and the receive end updates the display status of the corresponding motion picture after the receive end receives the picture data.

In this embodiment of this application, the display status of the motion picture can be updated in real time, to ensure real-time performance of screen projection.

The fourth aspect is a system solution corresponding to the first aspect and the third aspect. For beneficial effects of the fourth aspect, refer to related descriptions in the first aspect and the third aspect. Details are not described herein again.

A fifth aspect of an embodiment of this application provides a screen projection apparatus, including:

a data obtaining module, configured to: obtain a screen projection instruction, obtain a real-time interface of an application program on which screen projection is to be performed and device information of one or more receive ends, and obtain, from the real-time interface based on the device information, first data on which screen projection is to be performed and that corresponds to each receive end, where the first data on which screen projection is to be performed is a video stream, an audio stream, and/or a user interface control; and a data delivery module, configured to send, to the corresponding receive end, the first data on which screen projection is to be performed, so that each receive end generates a corresponding display interface based on the received first data on which screen projection is to be performed.

The fifth aspect is an apparatus solution corresponding to the first aspect. For beneficial effects of the fifth aspect, refer to related descriptions in the first aspect. Details are not described herein again.

A sixth aspect of an embodiment of this application provides a screen projection apparatus, including:

a data obtaining module, configured to: obtain a screen projection instruction, obtain a real-time interface of an application program on which screen projection is to be performed and device information of one or more receive ends, and obtain, from the real-time interface based on the device information, first data on which screen projection is to be performed and that corresponds to each receive end, where the first data on which screen projection is to be performed is a video stream, an audio stream, and/or a user interface control;

an interface generation module, configured to: generate, based on the first data on which screen projection is to be performed, a display interface corresponding to each receive end, and perform video coding on the display interface to obtain a corresponding real-time video stream; and a video sending module, configured to send the real-time video stream to the corresponding receive end, so that the receive end decodes and plays the received real-time video stream.

The sixth aspect is an apparatus solution corresponding to the second aspect. For beneficial effects of the sixth aspect, refer to related descriptions in the second aspect. Details are not described herein again.

A seventh aspect of an embodiment of this application provides a terminal device. The terminal device includes a memory and a processor. The memory stores a computer program that can be run on the processor. When the processor executes the computer program, the terminal device is enabled to implement the steps of the screen projection method according to any possible implementation of the first aspect, or the steps of the screen projection method according to any possible implementation of the second aspect, or the steps of the screen projection method according to any possible implementation of the third aspect.

An eighth aspect of an embodiment of this application provides a computer readable storage medium. The computer readable storage medium includes and stores a computer program. When the computer program is executed by a processor, a terminal device is enabled to implement the steps of the screen projection method according to any possible implementation of the first aspect, or the steps of the screen projection method according to any possible implementation of the second aspect, or the steps of the screen projection method according to any possible implementation of the third aspect.

A ninth aspect of an embodiment of this application provides a computer program product. When the computer program product is run on a terminal device, the terminal device is enabled to perform the screen projection method according to any possible implementation of the first aspect, or the steps of the screen projection method according to any possible implementation of the second aspect, or the steps of the screen projection method according to any possible implementation of the third aspect.

It may be understood that, for the beneficial effects of the seventh aspect to the ninth aspect, reference may be made to the related descriptions in the first aspect, the second aspect, or the third aspect. Details are not described herein again.

DETAILED DESCRIPTION OF ILLUSTRATIVE EMBODIMENTS

Figure 1A:
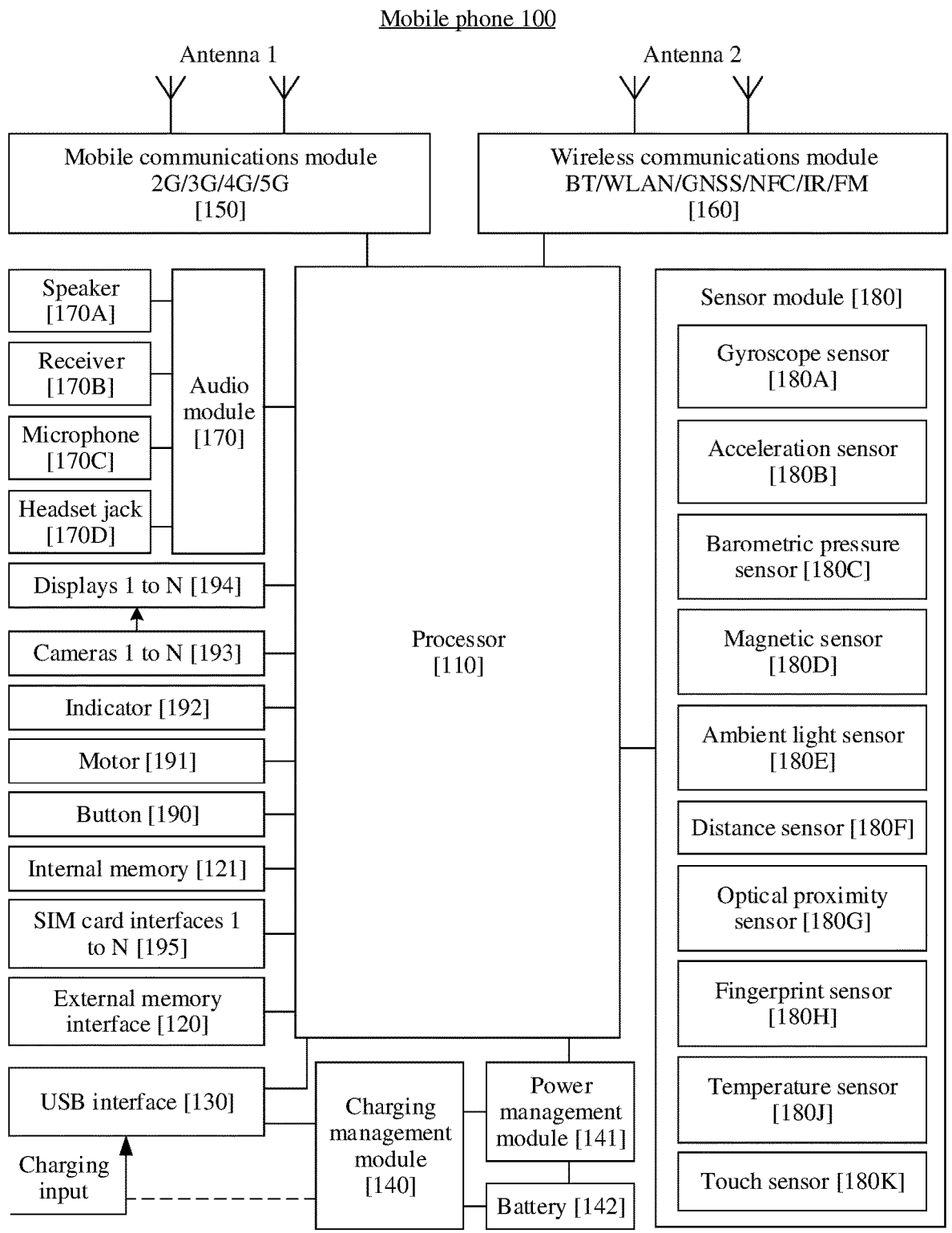
FIG. 1A is a schematic diagram of a structure of a mobile phone according to an embodiment of this application.

In the following description, to illustrate rather than limit, specific details such as a particular system structure and a technology are provided to make a thorough understanding of embodiments of this application. However, persons skilled in the art should know that this application may be implemented in other embodiments without these specific details. In other cases, detailed descriptions of well-known systems, apparatuses, circuits, and methods are omitted, so that this application is described without being obscured by unnecessary details.

To facilitate understanding of this application, embodiments of this application are first briefly described.

With the development of science and technology, a user has an increasing quantity of terminal devices, and the user has a higher requirement for screen projection-based sharing between terminal devices. To implement screen projection between terminal devices, the following manners may be generally used:

1. Mirroring screen projection manner: A transmit end delivers all content on a screen of the transmit end to a receive end in a mirroring manner for display.

2. File-based cross terminal device delivery: A transmit end performs video coding on a file such as a picture, an audio, a video, and a document and delivers a video to a receive end, and then the receive end decodes and plays the video.

3. When a receive end is a vehicle machine, a terminal device manufacturer, a vehicle manufacturer, and a third-party application developer design an interface system corresponding to a terminal device system in advance. A user connects the terminal device to the vehicle machine during use. In other words, interaction with the terminal device may be implemented by using an interface system in the vehicle machine, to implement screen projection for the terminal device.

For the implementation 1, all the content in the screen of the transmit end is projected to the receive end through mirroring screen projection. Some content in the screen may be content that the user does not want to deliver, for example, some sensitive information included in the screen. In addition, a receive end with a relatively small screen cannot implement a good display effect through mirroring screen projection. For example, if screen projection is performed on a screen of a mobile phone to a smart watch in a mirroring manner, because a display of the smart watch is generally relatively small, the user cannot normally view content of screen projection on the smart watch. Therefore, the implementation 1 has a single function and extremely low flexibility, and cannot meet a personalized requirement of the user.

For the implementation 2, only video coding, video decoding, and screen projection are performed on the file in the file-based cross-terminal device delivery. The user cannot perform screen projection on other content of the application interface. Therefore, content displayed in the implementation 2 is fixed. The implementation 2 has a single function and low flexibility, and cannot meet a personalized requirement of the user.

For the implementation 3, in actual application, the terminal device manufacturer formulates a template rule of the interface system, and the third-party application developer performs filling by using a user interface (User's Interface, UI) control or a video stream according to the template rule. In comparison with the implementations 1 and 2, some content in the interface of the transmit end may be selectively delivered. However, for the user, actually delivered content cannot be controlled, and a personalized requirement of the user cannot be met.

In conclusion, it can be learned that related screen projection technologies generally have problems of a single function, low flexibility, and incapability of the user in performing screen projection according to an actual requirement (that is, a personalized requirement of the user for screen projection cannot be met) of the user. To resolve these problems, in embodiments of this application, the user may select, according to an actual requirement, an application program on which screen projection needs to be performed. When an application program is selected, first, interface identification and UI control analysis are performed on the application program. In addition, UI control matching is performed based on an actual device status of each receive end, to determine a proper UI control for delivery for each receive end. Then, typesetting, rendering, and compositing are performed on data such as an audio, a video, and to-be-notified data of the UI control and the application program that are determined for delivery. Finally, the receive end displays the composite content. It can be learned from this that, in embodiments of this application, the user may independently select, according to an actual requirement of the user, the content for screen projection. In addition, selection, layout, and final screen projection may be adaptively performed on the UI control for screen projection based on an actual status of the receive end. In this way, the screen projection function in embodiments of this application is richer and more flexible, to well meet a personalized requirement of the user.

In embodiments of this application, the transmit end and the receive end may be both terminal devices such as a mobile phone, a tablet computer, and a wearable device. Specific terminal device types of the transmit end and the receive end are not limited herein, and may be determined according to an actual scenario. For example, in an actual scenario, when a mobile phone performs screen projection to a smart watch and a television, in this case, the mobile phone is the transmit end, and both the smart watch and the television are the receive ends.

The following describes an example in which the transmit end is a mobile phone. FIG. 1A is a schematic diagram of a structure of a mobile phone 100.

The mobile phone 100 may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a SIM card interface 195, and the like. The sensor module 180 may include a gyroscope sensor 180A, an acceleration sensor 180B, a barometric pressure sensor 180C, a magnetic sensor 180D, an ambient light sensor 180E, an optical proximity sensor 180G, a fingerprint sensor 180H, a temperature sensor 180J, and a touch sensor 180K (certainly, the mobile phone 100 may further include another sensor such as a temperature sensor, a pressure sensor, a distance sensor, or a bone conduction sensor, which is not shown in the figure).

It may be understood that the schematic structure in embodiments of this application constitutes no specific limitation on the mobile phone 100. In some other embodiments of this application, the mobile phone 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network Processing Unit, NPU). Different processing units may be independent devices, or may be integrated into one or more processors. The controller may be a nerve center and a command center of the mobile phone 100. The controller may generate an operation control signal based on an instruction operation code and a time sequence signal, to complete control of instruction fetching and instruction execution.

The memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor 110 may directly invoke the instructions or the data from the memory. This avoids repeated access, reduces a waiting time of the processor 110, and improves system efficiency.

The processor 110 may run a screen projection method provided in embodiments of this application, to enrich a screen projection function, improve screen projection flexibility, and improve user experience. The processor 110 may include different components. For example, when a CPU and a GPU are integrated, the CPU and the GPU may cooperate with each other to perform the screen projection method provided in embodiments of this application. For example, some algorithms in the screen projection method are executed by the CPU, and some algorithms are executed by the GPU, to obtain relatively high processing efficiency.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the mobile phone 100 may include one or N displays 194. Herein, N is a positive integer greater than 1. The display 194 may be configured to display information input by the user or information provided for the user, and graphical user interfaces (graphical user interface, GUI). For example, the display 194 may display a photo, a video, a webpage, a file, or the like. For another example, the display 194 may display a graphical user interface. The graphical user interface includes a status bar, a navigation bar that can be hidden, time and a weather widget (widget), and an icon of an application such as an icon of a browser. The status bar includes an operator name (for example, China Mobile), a mobile network (for example, 4G), time, and a state of charge. The navigation bar includes a back (back) key icon, a home (home) key icon, and a forward key icon. In addition, it may be understood that, in some embodiments, the status bar may further include a Bluetooth icon, a Wi-Fi icon, an icon of an externally connected device, and the like. It may be further understood that, in some other embodiments, the graphical user interface may further include a Dock column, and the Dock column may include a commonly used application icon and the like. After detecting a touch event of a finger (or a stylus, or the like) of the user for a specific application icon, in response to the touch event, the processor opens a user interface of an application corresponding to the application icon, and displays the user interface of the application on the display 194.

In embodiments of this application, the display 194 may be an integrated flexible display, or may be a spliced display including two rigid screens and a flexible screen located between the two rigid screens. After the processor 110 runs the screen projection method provided in embodiments of this application, the processor 110 may control an externally connected audio output device to switch an output audio signal.

The camera 193 (a front-facing camera or a rear-facing camera, or a camera may be used as both a front-facing camera and a rear-facing camera) is configured to capture a static picture or a video. Generally, the camera 193 may include a photosensitive element such as a lens group and a picture sensor. The lens group includes a plurality of lenses (a convex lens or a concave lens) configured to: collect an optical signal reflected by a to-be-photographed object, and transmit the collected optical signal to the picture sensor. The picture sensor generates an original picture of the to-be-photographed object based on the optical signal.

The internal memory 121 may be configured to store computer-executable program code. The executable program code includes instructions. The processor 110 implements various function applications and data processing of the mobile phone 100 through running the instructions stored in the internal memory 121. The internal memory 121 may include a program storage area and a data storage area. The program storage area may store an operating system, code of an application program (for example, the Camera application or the WeChat application), and the like. The data storage area may store data (for example, a picture and a video collected by the Camera application) and the like created in a process of using the mobile phone 100.

The internal memory 121 may further store one or more computer programs 1310 corresponding to the screen projection method provided in embodiments of this application. The one or more computer programs 1304 are stored in the foregoing memory 211 and configured to be executed by the one or more processors 110. The one or more computer programs 1310 include an instruction. The computer programs 1310 may include an account verification module 2111 and a priority comparison module 2112. The account verification module 2111 is configured to authenticate a system authentication account of another terminal device in a local area network. The priority comparison module 2112 may be configured to compare a priority of an audio output request service with a priority of a current output service of an audio output device. The status synchronization module 2113 may be configured to: synchronize the device status of the audio output device currently accessed by the terminal device to another terminal device, or synchronize the device status of the audio output device currently accessed by the another device to the mobile phone 100. When code of the screen projection method stored in the internal memory 121 is run by the processor 110, the processor 110 may control the transmit end to perform screen projection data processing.

In addition, the internal memory 121 may include a high-speed random access memory, and may further include a nonvolatile memory, for example, at least one magnetic disk storage device, a flash memory, or a universal flash storage (universal flash storage, UFS).

Certainly, the code of the screen projection method provided in embodiments of this application may be further stored in an external memory. In this case, the processor 110 may run, by using the external memory interface 120, the code of the screen projection method stored in the external memory. The processor 110 may control the transmit end to perform screen projection data processing.

The following describes functions of the sensor module 180.

The gyroscope sensor 180A may be configured to determine a motion posture of the mobile phone 100. In some embodiments, the gyroscope sensor 180A may be used to determine angular velocities of the mobile phone 100 around three axes (namely, x, y, and z axes). In other words, the gyroscope sensor 180A may be configured to detect a current motion status of the mobile phone 100, for example, jitter or static.

When the display in embodiments of this application is a foldable screen, the gyroscope sensor 180A may be configured to detect a folding operation or an unfolding operation performed on the display 194. The gyroscope sensor 180A may report the detected folding operation or the detected unfolding operation as an event to the processor 110, to determine a folding state or an unfolding state of the display 194.

The acceleration sensor 180B may detect a magnitude of acceleration of the mobile phone 100 in various directions (usually on three axes). In other words, the gyroscope sensor 180A may be configured to detect a current motion status of the mobile phone 100, for example, jitter or static. When the display in embodiments of this application is a foldable screen, the acceleration sensor 180B may be configured to detect a folding operation or an unfolding operation performed on the display 194. The acceleration sensor 180B may report the detected folding operation or the detected unfolding operation as an event to the processor 110, to determine a folding state or an unfolding state of the display 194.

The optical proximity sensor 180G may include a light-emitting diode (LED) and an optical detector, for example, a photodiode. The light-emitting diode may be an infrared light-emitting diode. The mobile phone emits infrared light by using the light emitting diode. The mobile phone detects reflected infrared light from a nearby object by using the photodiode. When sufficient reflected light is detected, it may be determined that there is an object near the mobile phone. When insufficient reflected light is detected, the mobile phone may determine that there is no object near the mobile phone. When the display in embodiments of this application is a foldable screen, the optical proximity sensor 180G may be disposed on a first screen of the foldable display 194. The optical proximity sensor 180G may detect a folding angle or an unfolding angle between a first screen and a second screen based on an optical path difference of an infrared signal.

The gyroscope sensor 180A (or the acceleration sensor 180B) may send the detected motion status information (such as an angular velocity) to the processor 110. The processor 110 determines, based on the motion status information, whether the mobile phone 100 is in a handheld state or a foot-held state (for example, when the angular velocity is not 0, it indicates that the mobile phone 100 is in the handheld state).

The fingerprint sensor 180H is configured to collect a fingerprint. The mobile phone 100 may use a feature of the collected fingerprint to implement fingerprint-based unlocking, application lock access, fingerprint-based photographing, fingerprint-based call answering, and the like.

The touch sensor 180K is also referred to as a "touch panel". The touch sensor 180K may be disposed on the display 194, and the touch sensor 180K and the display 194 form a touchscreen that is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided through the display 194. In some other embodiments, the touch sensor 180K may be alternatively disposed on a surface of the mobile phone 100 at a position different from a position of the display 194.

For example, the display 194 of the mobile phone 100 displays a home interface. The home interface includes icons of a plurality of applications (for example, the Camera application and the WeChat application). The user taps the icon of the Camera application on the home interface by using the touch sensor 180K, to trigger the processor 110 to start the Camera application and open the camera 193. The display 194 displays an interface of the Camera application, for example, a framing interface.

A wireless communication function of the mobile phone 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution such as 2G/3G/4G/5G applied to the mobile phone 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110. In embodiments of this application, the mobile communications module 150 may be further configured to exchange information with another terminal device, that is, send screen projection-related data to another terminal device, or the mobile communications module 150 may be configured to receive a screen projection request, and encapsulate the received screen projection request into a message in a specified format.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, or the like and that is applied to the mobile phone 100. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2. In embodiments of this application, the wireless communications module 160 is configured to: establish a connection to the receive end, and display projection content by using the receive end. Alternatively, the wireless communications module 160 may be configured to: access an access point device, send a message corresponding to the screen projection request to another terminal device, or receive a message that corresponds to an audio output request and that is sent by another terminal device.

In addition, the mobile phone 100 may implement an audio function such as music playing or recording over the audio module 170, the speaker 170A, the receiver 170B, the microphone 170C, the headset jack 170D, the application processor, and the like. The mobile phone 100 may receive an input of the button 190, and generate button signal input related to user setting and function control of the mobile phone 100. The mobile phone 100 may generate a vibration prompt (for example, an incoming call vibration prompt) by using the motor 191. The indicator 192 in the mobile phone 100 may be an indicator light, and may be configured to indicate a charging status and a power change, or may be configured to indicate a message, a missed call, a notification, and the like. The SIM card interface 195 in the mobile phone 100 is configured to connect to a SIM card. The SIM card may be inserted into the SIM card interface 195 or detached from the SIM card interface 195, to implement contact with and detachment from the mobile phone 100.

It should be understood that in an actual application, the mobile phone 100 may include more or fewer components than those shown in FIG. 1A. This is not limited in embodiments of this application. The mobile phone 100 shown in the figure is merely an example. The mobile phone 100 may have more or fewer components than those shown in the figure and may combine two or more components or have different component configurations. Various components shown in the figure may be implemented in hardware that includes one or more signal processors and/or application-specific integrated circuits, in software, or in a combination of hardware and software.

Figure 1B:
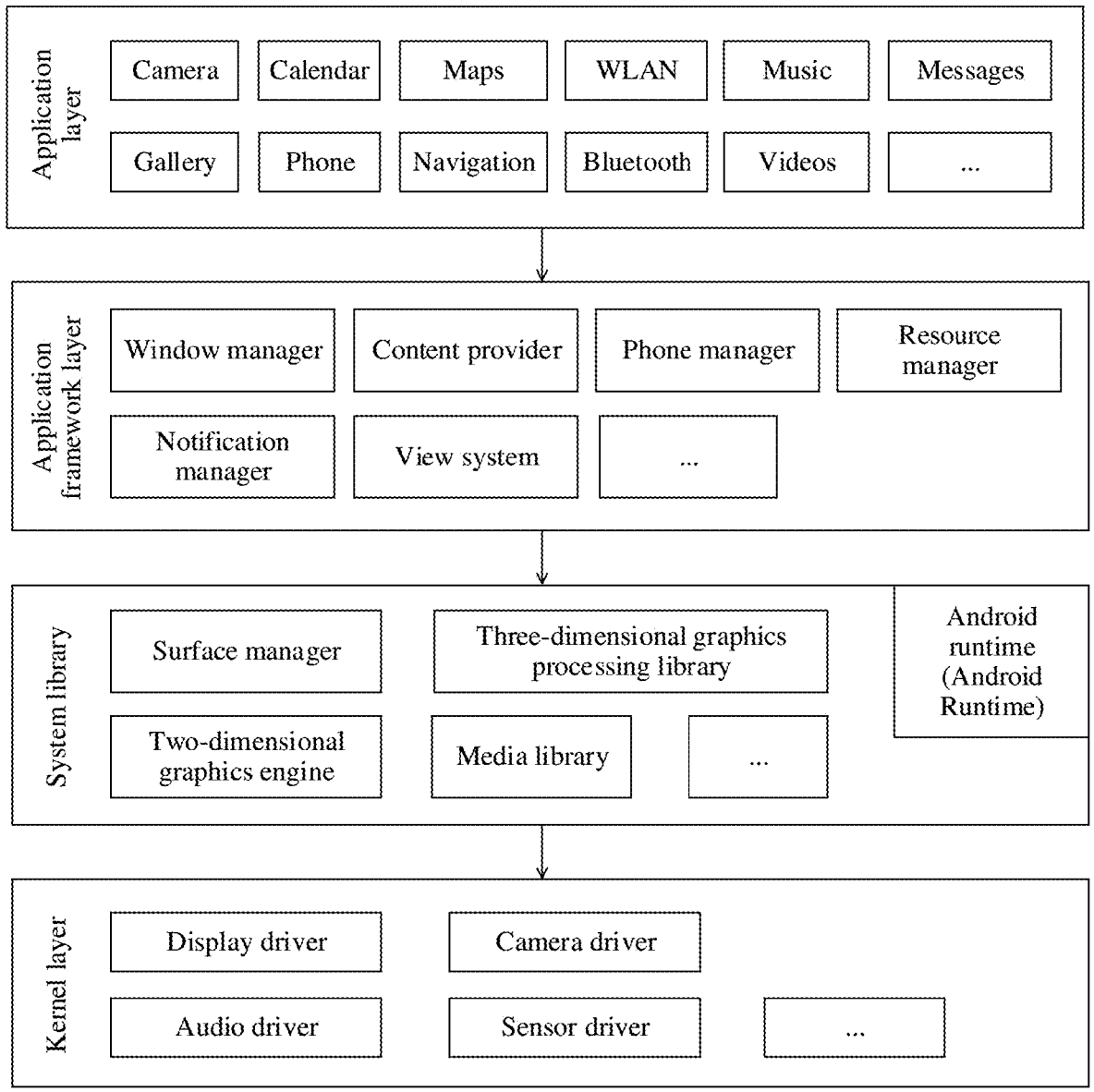
FIG. 1B is a block diagram of a software structure of a terminal device according to an embodiment of this application.

A software system of the terminal device may use layered architecture, event-driven architecture, microkernel architecture, micro service architecture, or cloud architecture. In embodiments of the present invention, an Android system of a layered architecture is used as an example to illustrate the software structure of the terminal device. FIG. 1B is a block diagram of a software structure of a terminal device according to an embodiment of the present invention.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 1B, the application packages may include applications such as Camera, Photos, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a notification icon of Messages may include a text display view and a picture display view.

The phone manager is configured to provide a communication function of the terminal device, for example, management of a call status (including answering, declining, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the terminal device vibrates, or the indicator light blinks.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats, for example, MPEG-4, H.164, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

To describe the technical solutions of this application, the following uses specific embodiments for description.

Figures 1, 2A:
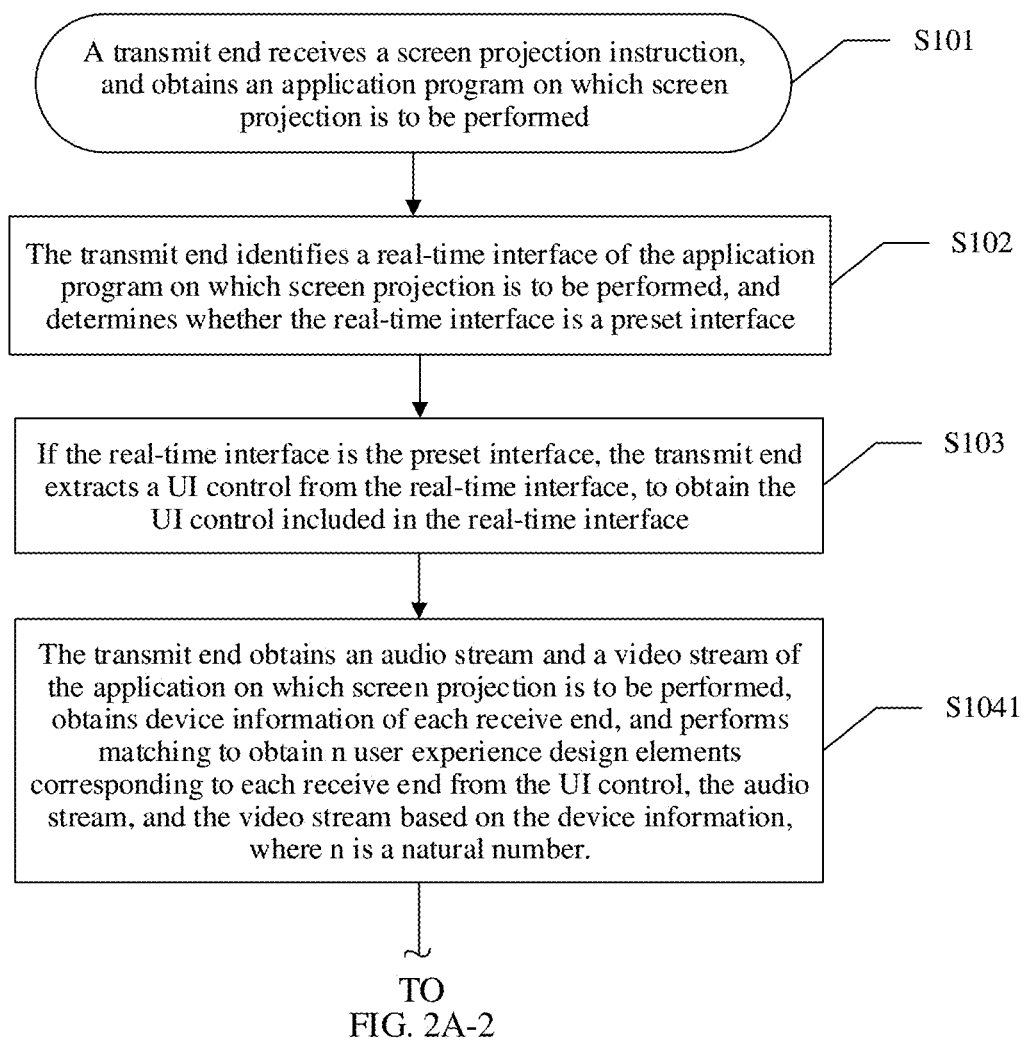
FIG. 2A-1 and FIG. 2A-2 are a schematic flowchart of a screen projection method according to an embodiment of this application.
Figures 2, 2A:
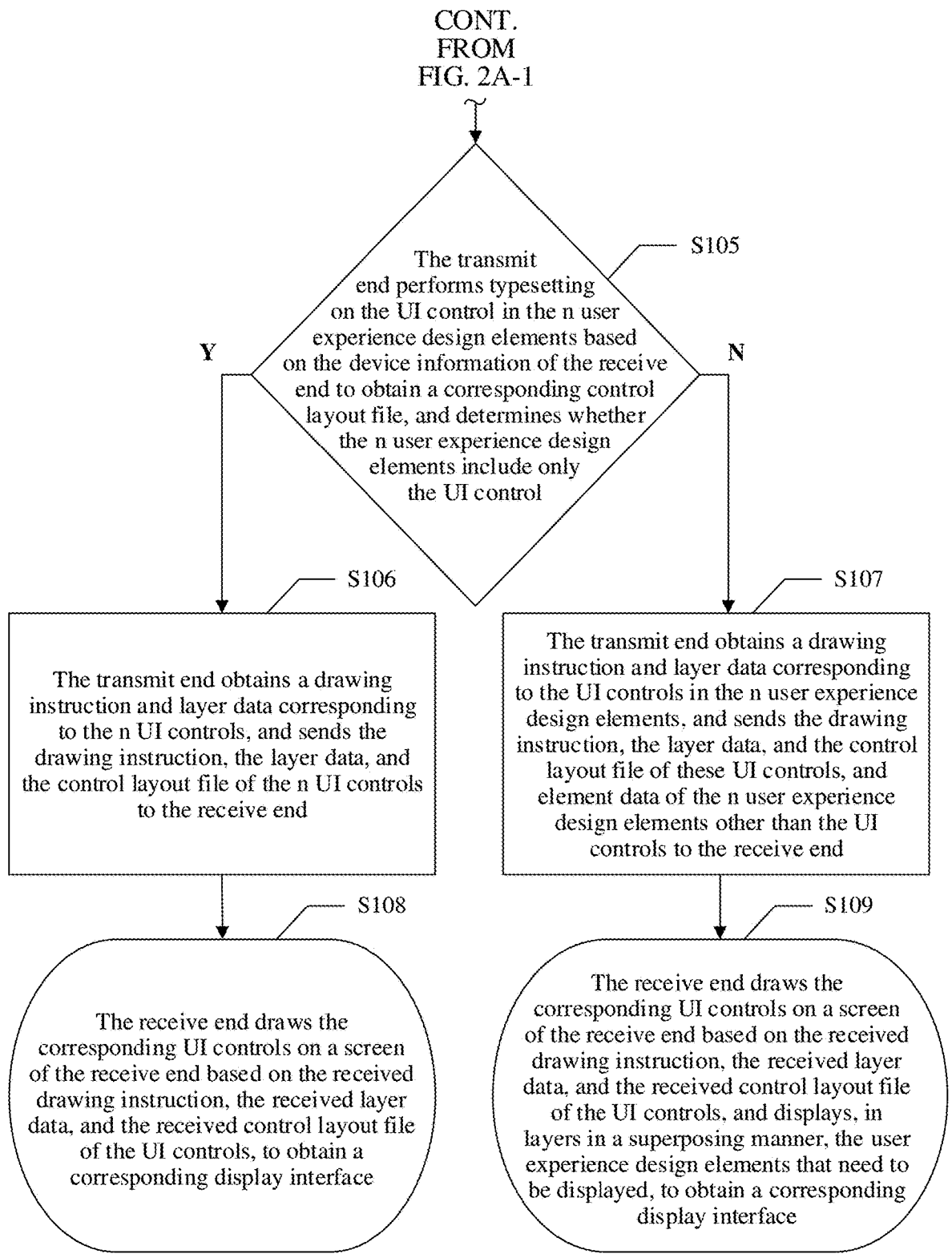

FIG. 2A-1 and FIG. 2A-2 are a flowchart of an implementation of a screen projection method according to an embodiment of this application. Details are described as follows:

S101: A transmit end receives a screen projection instruction, and obtains an application program on which screen projection is to be performed.

When receiving the screen projection instruction, the transmit end enables a screen projection function, and performs the operation of step S101. The screen projection instruction may be input by a user or a third-party device, or may be actively generated by the transmit end. This is specifically determined according to an actual application scenario.

Figure 2B:
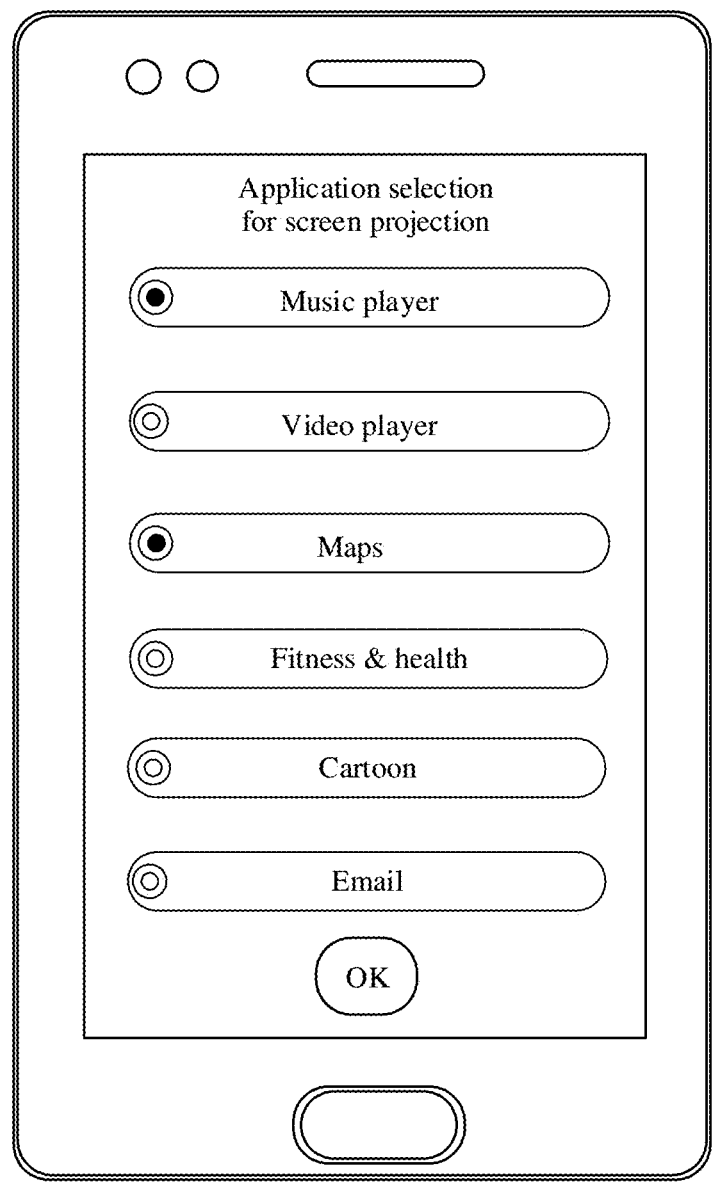
FIG. 2B is a schematic diagram of an application scenario according to an embodiment of this application.

In this embodiment of this application, an application program (referred to as an application for short) is used as an object for screen projection. Therefore, before screen projection is started, the transmit end first needs to determine an application on which screen projection needs to be performed for this time. In this embodiment of this application, the application on which screen projection is to be performed may be determined with reference to the following several manners:

1. After the transmit end enables a screen projection function of the transmit end, the user selects, from the transmit end according to an actual requirement, one or more applications on which screen projection needs to be performed. The transmit end determines, based on a selection instruction input by the user, a specific application on which screen projection needs to be performed, to meet a personalized screen projection requirement of the user. For example, refer to FIG. 2B. It is assumed that the transmit end is a mobile phone. After the mobile phone enables the screen projection function, an "application selection for screen projection" interface is opened. The user may freely select, in the "application selection for screen projection" interface, one or more applications on which screen projection is to be performed, and click for confirmation. For example, only a "Maps" application may be selected for screen projection, or two applications: a "Music player" and "Maps" may be both selected for screen projection.

2. A skilled person or the user presets one or more default applications on which screen projection is to be performed. After enabling the screen projection function of the transmit end, the transmit end sets, as an application in this time of screen projection, the default application on which screen projection is to be performed. When a personalized screen projection requirement of the user is met, the user does not need to perform application selection each time, so that an operation is more convenient. For example, with reference to FIG. 2B, it is assumed that the transmit end is a mobile phone. In this case, the user can manually enter the "application selection for screen projection" interface before the screen projection function is enabled, and select the default application. On this basis, in a next time of enabling the screen projection function, the application on which screen projection is to be performed may be selected based on the default application set by the user.

3. On the basis of setting the default application on which screen projection is to be performed in the manner 2, the user may enter the "application selection for screen projection" interface again to modify a current application on which screen projection is to be performed, after the transmit end enables the screen projection function. Based on the manner 2, the user can more flexibly control an application status at each time of screen projection in the manner 3.

4. The transmit end independently selects, according to a specific preset rule, one or more applications on which screen projection is to be performed. In the manner 4, the skilled person may preset some application selection rules. For example, a running application that supports screen projection may be selected as an application on which screen projection is to be performed. After the screen projection function is enabled, the application on which screen projection is to be performed is automatically selected according to the preset rule.

In actual application, the application on which screen projection is to be performed may be determined in any one of the foregoing four manners. Alternatively, the skilled person may set, according to a requirement for an actual application scenario, another method for determining an application on which screen projection is to be performed. The method for determining an application on which screen projection is to be performed is not excessively limited herein.

In addition, this embodiment of this application does not limit a development manner of the screen projection function. The skilled person may perform operations according to an actual case.

For example, in some optional embodiments, the screen projection function may be set as a system function into an operating system of the transmit end. In some other optional embodiments, in an actual case, it is difficult to set the screen projection function in some terminal devices due to limitation of factors such as technologies and costs. For example, for some mobile phones in old models, the costs of setting the screen projection function in a system is excessively high. Therefore, to meet a screen projection requirement of a terminal device in which the screen projection function cannot be set, in these optional embodiments, the screen projection function may be set in a screen projection application program. The screen projection application program is installed on the transmit end, so that the transmit end can have the screen projection function in this embodiment of this application.

In an optional embodiment of this application, when the transmit end has the screen projection function, a manner of enabling the screen projection function may be classified into passive enabling and active enabling of the transmit end. The following description is provided:

The passive enabling indicates that the transmit end is triggered by a screen projection instruction input by the user or the third-party device, to enable the screen projection function. For example, the user manually enables the screen projection function of the transmit end, or the third-party device triggers the screen projection function of the transmit end in a manner of sending an enabling instruction to the transmit end.

The active enabling indicates that the transmit end actively generates the screen projection instruction to enable the screen projection function. For example, the user may set a time point of automatically enabling the screen projection function at the transmit end, for example, 8:00 pm every evening. At the arrival of the time point, the transmit end actively generates the screen projection instruction and enables the screen projection function.

In actual application, the user may select any one of the foregoing manners according to an actual requirement, to enable the screen projection function of the transmit end.

S102: The transmit end identifies a real-time interface of the application program on which screen projection is to be performed, and determines whether the real-time interface is a preset interface.

With increasing functions of an application, one application may have a very large quantity of interfaces. For example, some music players have not only a music play interface and a music list interface, but also have a song information browsing interface, a singer information browsing interface, a comment browsing interface, an advertisement interface, and a webpage browsing interface. In actual application, it is found that screen projection of too many application interfaces affects normal use by the user and reduces user experience. For example, screen projection of some advertisement interfaces may affect normal viewing of the user for content of the application on which screen projection is performed.

To avoid an impact of displaying an excessively large quantity of interfaces on normal use by the user during screen projection, in this embodiment of this application, interfaces of an application are first classified into two types: a basic interface (that is, a preset interface) and a non-basic interface. The basic interface mainly indicates some core interfaces of the application, and includes some interfaces including a basic function or a key function, for example, a play interface of the music player or a navigation interface of the map. The basic interface may further include some interfaces that relatively greatly affect user experience, for example, a song information interface. The skilled person may specifically perform classification according to an actual requirement.

In addition, classification of the basic interface may be performed in a unit of a single application. In this case, each application has a precisely corresponding basic interface and a precisely corresponding non-basic interface. Alternatively, classification of the basic interface may be performed according to an application type. For example, basic interfaces of all music players are uniformly set to include a music play interface and a music list interface. In this case, a specific type of the application needs to be first determined, to learn of a basic interface and a non-basic interface corresponding to the application. Specific selection and setting may be performed by the skilled person according to an actual status of the application and a requirement of the user. This is not limited herein.

When a basic interface and a non-basic interface corresponding to each type of application are obtained through classification, operations such as UI control analysis and matching are performed on the basic interface in this embodiment of this application when the screen projection operation is performed, to ensure a screen projection effect of the basic interface. Therefore, after the application on which screen projection needs to be performed is determined in step S101, the real-time interface of the application on which screen projection is to be performed is identified in this embodiment of this application, to determine whether the real-time interface is a basic interface of the application on which screen projection is to be performed. A specific method for identifying a basic interface is not limited herein. The method may be set by the skilled person according to an actual requirement.

An optional implementation for identifying whether a real-time interface is a basic interface is provided. For an application on which screen projection is to be performed and whose package name (Package Name, where the package name indicates a name of an installation file of the application program and is a unique identifier of the application program) cannot be obtained by the transmit end, in this case, a basic interface corresponding to the application on which screen projection is to be performed cannot be directly determined. To identify whether the real-time interface of this type of application on which screen projection is to be performed is a basic interface, an identification model for identifying an application type based on a display interface may be trained in advance in this embodiment. Then, the identification model is used to identify the real-time interface, to obtain the application type of the application on which screen projection is to be performed. The basic interface corresponding to the application on which screen projection is to be performed is found based on the application type. Finally, it is identified whether the real-time interface is the basic interface corresponding to the application on which screen projection is to be performed. For example, it is assumed that the real-time interface of the application on which screen projection is to be performed is a music play interface. After the processing of the identification model, the application on which screen projection is to be performed may be identified as an application in a type of a music player. Then, it is found that the basic interface corresponding to the application in the type of the music player is the music play interface and the music list interface. Finally, it is identified whether the real-time interface belongs to the music play interface or the music list interface. If the real-time interface belongs to the music play interface or the music list interface, it indicates that the real-time interface is the basic interface of the application on which screen projection is to be performed.

In this embodiment of this application, a specific type of the identification model and the training method are not excessively limited, and may be selected or designed by the skilled person according to an actual requirement. In an optional embodiment of this application, a residual network model may be selected as the identification model in this embodiment of this application. The training method may be set as follows: collecting a plurality of sample interface pictures in advance, and marking a corresponding application type for each sample interface picture. For example, the music play interface corresponds to the music player type. On this basis, model training is performed on the sample interface pictures, to obtain an identification model for identifying an application type based on the interface pictures.

Another optional implementation for identifying whether a real-time interface is a basic interface is provided. For an application on which screen projection is to be performed and whose package name can be obtained by the transmit end, the application on which screen projection is to be performed can be identified in the same manner of identifying an application on which screen projection is to be performed and whose package name cannot be obtained. Alternatively, a basic interface corresponding to the application on which screen projection is to be performed may be found based on the package name (if it is preset that classification is performed based on an application type and a corresponding basic interface is set for each application type, the application type of the application on which screen projection is to be performed is determined based on the package name, and then the corresponding basic interface is found). Then, it is identified whether the real-time interface is the corresponding basic interface. For example, it is assumed that for all music players, corresponding basic interfaces are set as the music play interface and the music list interface, and other interfaces are all set as non-basic interfaces. In this case, if a package name of an application A on which screen projection is to be performed is obtained as an "xx music player", it may be determined that the application A on which screen projection is to be performed is a music player. Basic interfaces corresponding to the application A on which screen projection is to be performed are a music play interface and a music list interface. Then, it is identified whether the real-time interface belongs to the music play interface or the music list interface. If the real-time interface belongs to the music play interface or the music list interface, it is determined that the real-time interface is the basic interface. If the real-time interface does not belong to the music play interface or the music list interface, it is determined that the real-time interface is the non-basic interface.

It should be noted that a single running application may run in a background or in a foreground. The real-time interface of the application running in the background is not actually displayed on the screen of the transmit end but is displayed in the background. Therefore, for the application on which screen projection is to be performed and that runs in the background, a virtual display interface of the application on which screen projection is to be performed and that runs in the background may be obtained, to obtain the real-time interface of the application on which screen projection is to be performed.

S103: If the real-time interface is the preset interface, the transmit end extracts a UI control from the real-time interface, to obtain the UI control included in the real-time interface.

A single interface generally includes more content at the same time. If all the content is directly delivered to the receive end during the screen projection, it is difficult to ensure a display effect in the receive end. For example, when the screen of the transmit end is greater than the screen of the receive end, for example, a mobile phone performs screen projection to a smart watch, screen projection of all the content on the real-time interface may cause the receive end to fail in normally viewing the displayed content. Therefore, to ensure a final display effect at the receive end, flexibility of the screen projection is improved. In this embodiment of this application, the UI control is extracted from the real-time interface, and selection and screen projection are performed on the UI control. A method for extracting a UI control and attribute data in the real-time interface is not limited herein. The method may be set or selected by the skilled person according to an actual requirement.

In an optional implementation of extracting a UI control in this application, the extraction operation is as follows:

View node (ViewNode) data corresponding to the real-time interface is obtained. The view node data records some attribute data of the UI control of the application, for example, a drawing (Skia) instruction corresponding to the UI control, a size of the UI control, coordinates of the UI control, and a tree structure relationship among UI controls at a parent class and a child class.

The UI control is identified from the real-time interface by using a pre-trained control identification model, and the control type corresponding to the UI control is identified.

Attribute data of an unidentified UI control is removed from the view node data.

In this embodiment of this application, the UI control is identified in the real-time interface by using the control identification model, and the attribute data corresponding to the unidentified UI control is simultaneously removed from the view node data. In this case, the UI control included in the real-time interface and the attribute data of the UI control (including the attribute data in a view node and the identified control type) may be obtained, to provide basic data for subsequent matching and re-typesetting of the UI control. A model type of the control identification model and a training method are not limited herein, and may be selected or set by the skilled person according to an actual requirement.

In this application, several optional manners of selecting and training the control identification model include:

1. An R-CNN model, a Fast-R-CNN model, or a YOLO model may be selected as the control identification model. The training method is as follows: using, as training data, a plurality of application interface pictures including UI controls, performing training of UI control region identification on the control identification model, and completing model training until a preset convergence condition is met.

2. The residual network model may be selected as the control identification model. The training method is as follows: performing UI control picture clipping on an application interface picture in advance, marking a control type corresponding to each UI control picture, using the obtained UI control picture as sample data, performing training of UI control picture identification on the control identification model based on the sample data, and completing model training until a preset convergence condition is met.

Figure 2C:
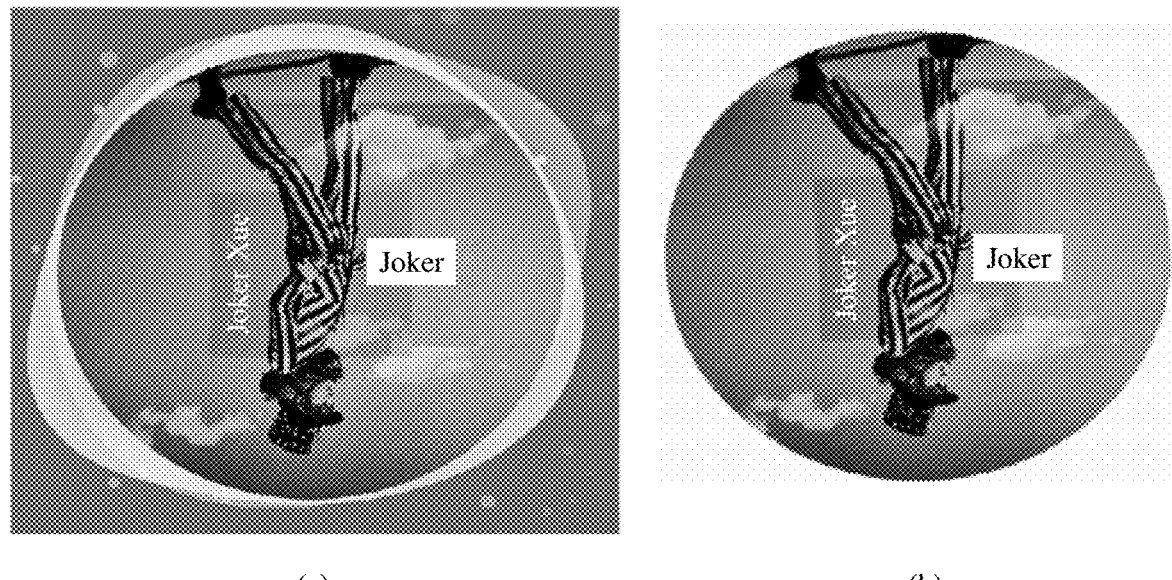
FIG. 2C is a schematic diagram of an application scenario according to an embodiment of this application.

3. The residual network model may be selected as the control identification model. In the foregoing training manner 2, the sample data is the UI control picture obtained after picture clipping is performed on the application interface picture. In consideration of this, due to background interference from a parent node, specific noise data usually exists in the sample data, for example, with reference to a part (a) in FIG. 2C. In this way, a specific impact is caused to an identification effect of the final control identification model.

Figure 2D:
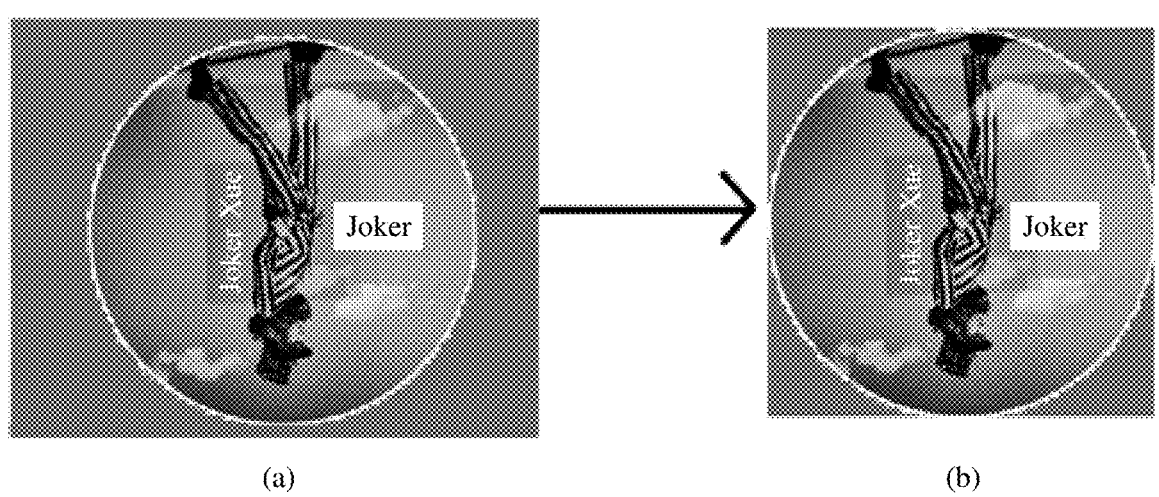
FIG. 2D is a schematic diagram of an application scenario according to an embodiment of this application.

To improve the identification effect of the control identification model, in the manner 3, the training method is as follows: performing independent picture drawing on the UI control in advance based on a drawing instruction by using an interface provided in a system of the transmit end. In this case, the UI control picture without background noise may be obtained. For example, refer to a part (b) in FIG. 2C. At the same time, control types corresponding to UI control pictures are marked, and the pictures corresponding to the UI controls are obtained as sample data. Training of UI control picture identification is performed on the control identification model based on the sample data, and model training is completed until a preset convergence condition is met. To further improve the identification effect of the control identification model, before the model is trained, the method may further include: obtaining a minimum effective pixel range for the drawn UI control picture. Selecting the minimum effective pixel range for the UI control picture indicates removing pixels outside a circumscribed rectangular block of the UI control, to eliminate blank-leaving around the UI control picture. For example, with reference to FIG. 2D, a part (b) in FIG. 2D is a UI control picture obtained after processing of selecting the minimum effective pixel range is performed on a part (a).

When the UI control is identified in the real-time interface by using the control identification model obtained through training in the manner 3, a picture of each UI control in the real-time interface may be first drawn by using the interface provided in the system of the transmit end. Then, the drawn UI control picture is used as input data for model processing identification. Before the UI control picture is input to the control identification model, the processing of the minimum effective pixel range is performed on the UI control picture, to improve identification accuracy.

In this embodiment of this application, a type of the control identification model and the training method that are specifically used are not excessively limited. The skilled person may train the control identification model in any one of the foregoing three manners according to an actual requirement. For example, to eliminate an impact of the background noise in the UI control picture and improve the identification effect of the control identification model, the manner 3 may be selected to train the control identification model. If drawing of the UI control picture cannot be implemented, for example, cooperation of the interface in the system of the transmit end cannot be implemented, in this case, the manner 1 or the manner 2 may be selected for processing. In addition, the skilled person may also independently select or design another manner to train and obtain the required control identification model.

In an optional embodiment of this application, the real-time interface of the application on which screen projection is to be performed may not be a basic interface when the screen projection function is enabled in an actual case. In consideration of this, when the real-time interface is the non-basic interface, normal running of the screen projection is ensured, to ensure a man-machine interaction operation and experience of the user. In this embodiment of this application, any one of the following manners may be selected for processing:

1. Deliver an interface with a blank background to the receive end, and prompt, in the interface, the user to switch the application interface.

2. Before the basic interface is identified, perform an operation in a mirroring screen projection manner.

Before the user switches to the basic interface, any one of the foregoing manners may be selected for display processing. However, after the user switches to the basic interface, and that the real-time interface is the basic interface is detected in step S102 in this embodiment of this application, the operation of step S103 is further performed in this embodiment of this application.

S1041: The transmit end obtains an audio stream and a video stream of the application on which screen projection is to be performed, obtains device information of each receive end, and performs matching to obtain n user experience design elements corresponding to each receive end from the UI control, the audio stream, and the video stream based on the device information, where n is a natural number.

In this embodiment of this application, a quantity of receive ends may be 1, or may be an integer greater than 1. When the quantity is 1, one-to-one screen projection from the transmit end to the receive end may be implemented. For example, screen projection is performed on content of a mobile phone to a television. When the quantity is greater than 1, one-to-many screen projection from the transmit end to the receive end may be implemented. The receive end may be a device and a screen that include an independent system or a non-independent system. For example, in a future operator cabin scenario, peripheral terminal devices may include a head-up display, a liquid crystal dashboard, and an in-vehicle central control screen. These may all be used as the receive ends in this embodiment of this application. For another example, when the transmit end is a mobile phone, the receive end may include: a tablet computer, a personal computer, a television, a vehicle machine, a smart watch, a headset, acoustic equipment, a virtual reality device, and an augmented reality device. Alternatively, more other devices may be added according to an actual requirement.

A user experience design (User experience design, UX) element (also referred to as a man-machine interaction element) indicates a data element that may affect user experience in a terminal device, for example, the following several common UX elements:

1. a UI control included in an application interface;
2. an audio stream, that is, an audio stream in a media type, for example, music played by a music player;
3. a video stream that may be mirroring video data or may be video data at a specific layer;
4. to-be-notified data, that is, service data in use on a terminal device, for example, information about a song being played (a song name, a performer, an album picture, and the like), information in a call process (a contact, a phone number, and the like), and push data of some applications, where for example, in a mobile phone, the to-be-notified data is generally pushed and displayed in a status bar of the mobile phone or is pushed and displayed in a form of a pop-up window, and the to-be-notified data may exist independently of the application on which screen projection is to be performed, for example, may be a warning notification sent by the system of the transmit end.

On the transmit end, one application may include a plurality of UX elements. Different receive ends may have different hardware configurations and different interaction manners with the user. For example, a screen of a smart watch is far smaller than a screen of a television, but the smart watch has a higher operation convenience, that is, lower interaction complexity than the television. These hardware configurations, interaction manners, and the like affect operations such as viewing and interaction performed on the UX element by the user by using the receive end, thereby further affecting user experience. Therefore, in this embodiment of this application, all content of the application on which screen projection is to be performed is not directly delivered to the receive end, but a proper UX element is adaptively matched for delivery based on the device information of the receive end. A specific adaptive matching method is not excessively limited herein. The method may be selected or set by the skilled person according to an actual requirement. For example, it may be determined based on the device information of the receive end whether each UX element meets requirements in two dimensions: a display size and interaction complexity. All UX elements that meet the requirements are set as successively matching UX elements. Based on different actual matching cases, a quantity of successfully matching UX elements of each receive end may be small, for example, may be 0; or may be large. For example, successful matching is implemented for all the UX elements. Therefore, in this embodiment of this application, a value of n needs to be determined based on an actual matching status.

In this embodiment of this application, the first data on which screen projection is to be performed and the second data on which screen projection is to be performed both indicate the UX elements. The second data on which screen projection is to be performed indicates all the extracted UX elements. The first data on which screen projection is to be performed indicates the selected UX element obtained after matching performed on the receive end.

In an optional embodiment of this application, the adaptive matching operation performed on the UX elements includes:

dividing the video stream and the UI control included in the real-time interface into one or more element sets, where each data set includes a video stream or at least one UI control, and no intersection set exists between the element sets;

calculating a user experience score for each element set to obtain a corresponding set experience score, calculating a user experience score for the device information of the receive end to obtain a corresponding device experience score, and performing matching between the set experience score and the device experience score to determine m element sets corresponding to the receive end, where m is a natural number; and calculating a user experience score for the audio stream to obtain a corresponding audio experience score, performing matching between the audio experience score and the device experience score, and if the matching succeeds, determining that the audio stream is a user experience design element corresponding to the application on which screen projection is to be performed.

In this embodiment of this application, the user experience score is a quantization score value that the UX element or the terminal device affects user experience. The user experience score of the UX element may also be referred to as a data interaction score of the UX element. A specific method for calculating a user experience score is not limited herein, and may be selected or set by the skilled person according to an actual requirement. For example, comprehensive scoring may be performed in three dimensions: a visual effect dimension, a sound effect dimension, and interaction complexity. The visual effect dimension may be evaluated by using a size of a UX element and a size of a display (or a size of an available display) of a terminal device. For example, corresponding experience scores are separately set for different sizes. The sound effect dimension may be evaluated by using audio stream quality and sound quality of the terminal device. For example, corresponding experience scores are respectively set for different quality and sound quality. The sound quality of the terminal device may be indicated by using a distortion degree and a frequency response of an audio output of the terminal device. The interaction complexity may also be evaluated by using a size of a UX element and a size of a display of a terminal device. Finally, experience scores in these dimensions are summed to obtain the user experience score corresponding to the UX element or the terminal device. When the user experience score of the UI control is calculated, processing calculation may be performed based on attribute data of the UI control. For the element set including the plurality of UX elements, the entire element set may be used as an entity to calculate the user experience score. For example, in the visual effect dimension in the foregoing example, the experience scores corresponding to sizes of the UX elements in the element set may be summed to obtain the experience score corresponding to the element set.

The UX elements may be classified into two types based on whether the UX elements need to be displayed at the receive end. One type of UX element is a UX element that needs to be displayed, for example, a video stream and a UI control. The other type of UX element is a UX element that does not need to be displayed, for example, an audio stream. When the receive ends have different display configurations, these UX elements that need to be displayed affect a visual effect and a man-machine interaction effect of the user, thereby affecting user experience. Therefore, in this embodiment of this application, the UX elements that need to be displayed are divided into one or more element sets. Each element set is used as a minimum screen projection unit for matching and screen projection of the receive end. A quantity of UX elements specifically included in each element set is not limited herein, and may be set by the skilled person according to an actual requirement, provided that the element set is not an empty set. For example, when the quantity of UX elements included in each element set is 1, screen projection is performed in a unit of a single UX element. When each element set includes one type of UX element, screen projection may be performed in a unit of a single type of UX element. For example, the UX elements included in the real-time interface may be divided into an element set A and an element set B. Herein, UX elements included in the element set A are all UX elements in a control type, for example, a play control, a fast forward control, and a video switch control in a video player; and UX elements included in the element set B are all UX elements in a non-control type, for example, a video play control, a video stream, and an advertisement control. When all the UX elements in the real-time interface are divided into one element set, screen projection may be implemented in a unit of the entire real-time interface. In other words, each time of screen projection is complete screen projection of all the UI controls and the video streams in the real-time interface. After the m element sets corresponding to the receive end are determined, all the UX elements included in the m element sets are UX elements matching the receive end. Herein, a value of m is determined according to an actual scenario.

For an audio stream that does not need to be displayed, a corresponding user experience score may be independently evaluated, to determine whether the receive end is proper for outputting the audio stream. For the method for calculating the user experience score, refer to the foregoing method for calculating the user experience score of the UX element that needs to be displayed. Details are not described herein again.

In consideration of an actual scenario, there may be some other UX elements that need to be pushed in addition to the video stream, the audio stream, and the UI control, for example, the foregoing to-be-notified data and some motion sensing data such as vibration data and electrical stimulation data. To implement compatibility with these UX elements, step S1041 may also be replaced with any one of the following operations: steps S1042, S1043, and S1044.

S1042: Obtain to-be-notified data of the transmit end, and an audio stream and a video stream of the application on which screen projection is to be performed, obtain device information of each receive end, and perform matching to obtain n user experience design elements corresponding to the receive end from the UI control, the audio stream, the video stream, and the to-be-notified data based on the device information, where n is a natural number. If the n user experience design elements include the UI control, step S105 is performed.

S1043: Obtain an audio stream, a video stream, and motion sensing data of the application on which screen projection is to be performed, obtain device information of each receive end, and perform matching to obtain n user experience design elements corresponding to the receive end from the UI control, the audio stream, the video stream, and the motion sensing data based on the device information, where n is a natural number. If the n user experience design elements include the UI control, step S105 is performed.

S1044: Obtain the to-be-notified data of the transmit end, and the audio stream, the video stream, and the motion sensing data of the application on which screen projection is to be performed, obtain device information of each receive end, and perform matching to obtain n user experience design elements corresponding to the receive end from the UI control, the audio stream, the video stream, the to-be-notified data, and the motion sensing data based on the device information, where n is a natural number. If the n user experience design elements include the UI control, step S105 is performed.

It may be learned from comparison between steps S1041, S1042, S1043, and S1044 that a difference is that the extracted UX elements have different content. However, principles of steps S1042, S1043, and S1044 are basically the same as a principle of step S1041. Therefore, for related principles and operation descriptions, refer to the foregoing description of the S1041. Details are not described herein again.

It should be noted that the to-be-notified data belongs to the UX element that needs to be displayed, and the motion sensing data belongs to the UX element that does not need to be displayed. Therefore, the adaptive matching operation on the UX element is performed by using the foregoing method for calculating the user experience score. In this case, the to-be-notified data needs to be divided into one or more element sets together with the UI control and the video stream. Calculation and matching are performed on the user experience scores. The motion sensing data may be not divided into the element set. Instead, the user experience score corresponding to the motion sensing data is independently calculated as the audio stream. Because many terminal devices do not support motion sensing output, when the user experience score is calculated for the motion sensing data, whether the corresponding motion sensing output is supported may be used as an independent reference dimension for the user experience score.

In another optional implementation of performing matching between the UX element and the receive end in this application, the skilled person or a third-party partner may preset some matching rules between the UX element and the receive end. For example, the smart watch may be set to deliver only a UI element in a control type, and the television may be set to deliver only a video stream and an audio stream. In this case, adaptive matching between the UX element and the receive end may be implemented according to a specified matching rule. For another example, one-to-one matching may be performed in dimensions such as a size of a UX element, a visual requirement, interaction complexity, and a use frequency, and a final matching result between the UX element and the receive end is determined based on the matching result in each dimension.

In another optional implementation of performing matching between the UX element and the receive end in this application, a neural network model may be pre-trained to adaptively match a proper UX element for the terminal device. In this case, it is unnecessary to calculate a user experience score of each UX element and each receive end. The neural network model individually completes the matching.

It should be specifically noted that when there are a plurality of applications on which screen projection is to be performed, the foregoing operations such as steps S102, S103, and S1041 on the real-time interface are independent of each other for each application on which screen projection is to be performed. In addition, this embodiment of this application does not limit a quantity of receive ends to which screen projection can be performed on a single UX element. Therefore, in this embodiment of this application, a single UX element may fail in matching all the receive ends, and consequently, screen projection is finally not performed on the single UX element to the receive end. Alternatively, a single UX element may successfully match one or more receive ends, and finally screen projection is performed to the one or more different receive ends. In addition, a quantity of to-be-delivered UX elements corresponding to a single receive end may also be different according to different adaptive matching rules. For example, in the foregoing example of calculating the user experience score and performing matching, if the adaptive matching rule is set to that an element set with a highest experience score whose set experience score is greater than or equal to a device experience score is determined to be successfully matched, each receive end corresponds to only a UX element in one element set (it is assumed that the audio stream fails in the matching). The adaptive matching rule is set to determine that all element sets whose set experience scores are greater than or equal to device experience scores are all determined to be successfully matched. In this case, each receive end may correspond to a plurality of element sets.

In addition, to obtain the device information of the receive end and perform screen projection to the receive end, before step S1041, connection networking between the receive end and the transmit end further needs to be performed.

In this embodiment of this application, a networking manner of the receive end and the transmit end is not excessively limited, and may be selected or set by the skilled person according to an actual requirement. For example, in some optional embodiments, connection networking may be performed in a wired connection manner such as a USB. In some other optional embodiments, networking may be performed in a wireless connection manner such as Bluetooth and Wi-Fi.

In an optional embodiment of this application, a radio access point (Access Point, AP) networking manner may be selected and used, and the transmit end and the receive end are placed in a network of the same AP device. The transmit end and the receive end can communicate with each other through the AP device to implement connection networking.

In another optional embodiment of this application, a peer-to-peer network (Peer-to-Peer Network, P2P) networking manner may be selected and used, and a device in the transmit end and the receive end is used as a central device to create a wireless network. The central device discovers another non-central device through scanning and broadcasting over Bluetooth. The non-central device accesses the wireless network. Finally, a one-to-many network is formed.

After connection networking between the receive end and the transmit end is completed, the transmit end may obtain the device information of the receive end in an active manner or a passive manner, to implement adaptive matching on the UX element. The actively obtaining performed by the transmit end indicates that the transmit end actively initiates a device information obtaining request to the receive end, and then the receive end returns the corresponding device information. The passively obtaining performed by the transmit end indicates that after connection networking is completed, the receive end actively sends the device information of the receive end to the transmit end.

In an optional embodiment of this application, if the n user experience design elements selected in step S1041, S1042, S1043, or S1044 do not include the UI control, the n user experience design elements may be sent to the receive end and output by the receive end. In this case, the control typesetting operation in step S105 does not need to be performed. For example, when the n user experience design elements have only an audio stream and a video stream, the audio stream may be sent to the receive end for playing. In this case, operations such as typesetting and layout of the UI control do not need to be performed. In addition, if the selected user experience design element does not include the element that needs to be displayed, and includes only the audio stream, the receive end may not perform displaying. For example, a smart sounder only outputs an audio stream without any content. In this case, a related operation of a display interface does not need to be performed in this embodiment of this application. For example, operations such as UI control typesetting and video stream compositing do not need to be performed.

In another optional embodiment of this application, if the n user experience design elements selected in step S1041, S1042, S1043, or S1044 include the UI control, step S105 is performed.

S105: The transmit end performs typesetting on the UI control in the n user experience design elements based on the device information of the receive end to obtain a corresponding control layout file, and determines whether the n user experience design elements include only the UI control. If the n user experience design elements include only the UI control, step S106 is performed. If the n user experience design elements include another element other than the UI control, step S107 is performed.

Some UI controls in the real-time interface may be discarded in a matching process of the UX elements in steps S1041, S1042, S1043, and S1044. At the same time, screen statuses of the receive end and the transmit end, actual scenarios in which the devices, and the like are located may be different. For example, the size of the screen of the receive end may be smaller than the size of the screen of the transmit end, or a space size available on the screen of the receive end may be smaller than the size of the screen of the transmit end. For another example, an actual application scenario of a vehicle machine is that interaction is highly required to be easy in a vehicle of the user. Due to these factors, it is difficult for original typesetting and layout of the UI control in the real-time interface to adapt to interface display of the receive end. To ensure a display effect of the UI control in the receive end, facilitate operations of the user, and ensure a requirement of the user for man-machine interaction, after the UI control on which screen projection needs to be performed are selected, typesetting and layout are performed on the UI control again in this embodiment of this application. In this embodiment of this application, a typesetting and layout method is not specifically limited, and may be selected or set by the skilled person according to an actual requirement.

In this application, a specific optional implementation of performing typesetting and layout on the UI control includes:

Step 1: Obtain size information of the real-time interface, and position information and size information of the UI control in the real-time interface, and draw a distribution diagram corresponding to the UI control in the real-time interface based on the size information of the real-time interface, and the position information and the size information of the UI control in the real-time interface.

Step 2: Identify a first typesetting type corresponding to the distribution diagram.

Step 3: Determine, based on the device information, a second typesetting type corresponding to the first typesetting type.

In consideration that different terminal devices may have different actual application scenarios, requirements of the user for interface display and man-machine interaction also vary in these different application scenarios. For example, for the vehicle machine, in many application scenarios, the user performs man-machine interaction with the vehicle machine in a driving process. Therefore, complexity of man-machine interaction of the vehicle machine needs to be relatively low, to ensure normal use by the user.

To meet actual requirements of different receive ends for man-machine interaction and facilitate the user in viewing and operating the display interface of the receive end, typesetting of the UI control in the application interface in this embodiment of this application is classified into a plurality of types (which may also be referred to as typesetting styles of the UI control). A specific type classification rule is not limited herein. The rule may be selected or set by the skilled person according to an actual requirement. For example, a typesetting type of an upper-middle-lower structure and a typesetting type of a left-middle-right structure may be included. In the upper-middle-lower structure, the application interface is divided into three parts of regions: an upper region, a middle region, and a lower region. The UI controls are distributed as a whole in the application interface in upper-middle-lower parts. For example, a UI control in a screen of the mobile phone is generally in the typesetting type of the upper-middle-lower structure. In the left-middle-right structure, the application interface is divided into three parts of regions: a left region, a middle region, and a right region. The UI control is distributed as a whole in the application interface in the left-middle-right parts. For example, layout of UI controls is implemented in application interfaces of some vehicle machines according to the left-middle-right structure. In addition, layout of UI controls may also be implemented in application interfaces of some other vehicle machines according to the upper-middle-lower structure.

When different typesetting types are obtained through classification, in this embodiment of this application, one or more proper typesetting types are selected and set for different terminal devices when the typesetting type facilitates a requirement of the user for man-machine interaction. For example, a typesetting type of a left-middle-lower structure is relatively proper for the vehicle machine. In this case, the typesetting type of the left-middle-lower structure may be set to the typesetting structure corresponding to the vehicle machine. In addition, relative position information and relative size information of the UI control in the application interface are set in these typesetting types. For example, in the typesetting type of the upper-middle-lower structure, a part of the UI control may be set in an upper region part, and a relative size is set to a half of a size of the upper region part. On this basis, a typesetting type mapping relationship is set for each type of terminal device. In other words, for various typesetting types that may appear in the real-time interface, a typesetting type after the UI control corresponding to the terminal device is rearranged is set. The typesetting type after the rearrangement is the foregoing properly set typesetting type of the terminal device.

When the typesetting relationship is set, the distribution diagram corresponding to the UI control in the real-time interface is drawn based on the size information of the real-time interface, and the position information and the size information of the UI control in the real-time interface in this embodiment of this application. Because the distribution diagram records a size and a position of the UI control in the real-time interface, an actual typesetting type (that is, the first typesetting type) corresponding to the UI control in the real-time interface may be determined through identifying the distribution diagram. Then, the typesetting type mapping relationship corresponding to the receive end is determined based on the device information of the receive end, and a target typesetting type (that is, the second typesetting type) corresponding to the UI control may be determined through querying the typesetting mapping relationship.

In an optional embodiment of this application, in consideration that the size of the real-time interface may be relatively large, for example, resolutions of some mobile phones may reach 2240×1080, a computation amount of processing the distribution diagram of the UI control is relatively large. To reduce the computation amount and improve performance of the terminal device, in this embodiment of this application, before step 2, the distribution diagram may be further scaled down with a size ratio unchanged. For example, a distribution diagram with a size of 2240×1080 may be scaled down to 56×27. Then, the operation in step 2 is performed based on the distribution diagram after the scale-down.

Step 4: Obtain relative position information and relative size information of each UI control in the display interface of the receive end based on the second typesetting type, and generate a corresponding control layout file based on view node data of the real-time interface, and relative position information and relative size information of each UI control.

After the target typesetting type is determined, the relative position information and the relative size information of each UI control in the interface after typesetting and rearrangement may be determined. In addition, more attribute data of each UI control may be further obtained based on the view node data of the real-time interface in this embodiment of this application, for example, attribute data such as a rotation angle and operability of the UI control. Then, the relative position information, the relative size information, and the newly obtained attribute data of the UI control are all packed into the corresponding control layout file. Because the control layout file already stores all data required for typesetting of the UI control, the receive end may subsequently implement layout and rearrangement of the UI control based on the control layout file, and draw the UI control after the typesetting and rearrangement.

The target typesetting type records only an overall relative position of the UI control in the application interface. For example, the typesetting type of the left-middle-right structure records only the three parts of regions: the left region, the middle region, and the right region in which the UI control is distributed in the application interface. In consideration of this, in actual application, a more accurate relative position and a more accurate relative size of each UI control on which screen projection is to be performed and that is originally in the real-time interface may be further determined in the interface after the typesetting and rearrangement.

In an optional embodiment of this application, to determine the actual relative position and the relative size of the UI control in the interface after the typesetting and rearrangement, a position conversion rule between typesetting types is preset in this embodiment of this application. For example, the rule may be set as follows: when mapping is performed between the typesetting type of the upper-middle-lower structure and the typesetting type of the left-middle-right structure, mapping all UI controls in the upper region part to the left region part, mapping all UI controls in the middle region part to the middle part, and mapping all UI controls in the lower region part to the right region part. In addition, a filling manner of a UI control in each region part of the application interface may be further preset, to determine accurate relative position information and accurate relative size information of each UI control. For example, if only one UI control exists in a single region after the mapping, entire region space may be filled with the UI control. In this case, a relative position and a relative size of the region in the application interface are the relative position and the relative size of the UI control.

In another specific optional implementation of performing typesetting and rearrangement on the UI control in this application, the skilled person or a third-party partner may alternatively preset the typesetting and layout manner of the application on which screen projection is to be performed on each type of receive end, that is, preset the control layout file corresponding to the UI control in the receive end. In this case, the UI control after the typesetting and rearrangement may be directly drawn through the rearrangement and layout of the UI control based on the preset control layout file.

Figure 2E:
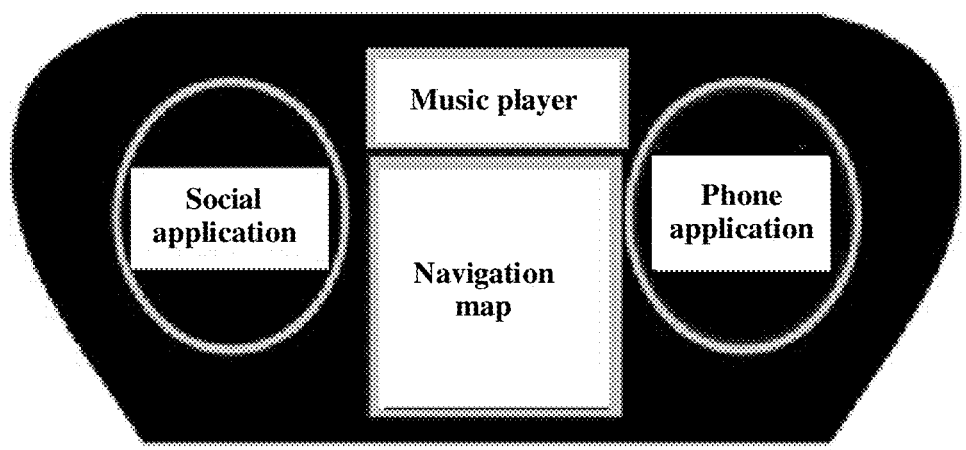
FIG. 2E is a schematic diagram of an application scenario according to an embodiment of this application.

It should be specifically noted that, if a plurality of applications on which screen projection is to be performed all have a UI control on which screen projection needs to be performed to the same receive end, layout of the UI control of each application on which screen projection is to be performed may be independently performed when typesetting and layout are performed on the UI control in step S105. When an interface is generated after typesetting and rearrangement are performed at the receive end, the interface is generated in a space region corresponding to the screen based on the control layout file corresponding to each application on which screen projection is to be performed. For example, with reference to an example shown in FIG. 2E, it is assumed that screen projection needs to be performed on four applications including a social application, a music player, a navigation map, and a phone application to the receive end in FIG. 2E. In this case, an available space region of each application needs to be determined on the screen of the receive end. The typesetting and layout operations on a UI control of each application may be independently performed. However, drawing of the interface after the typesetting and rearrangement needs to be implemented in only the space region corresponding to the application. In this embodiment of this application, when screen projection is not performed on a plurality of applications to the same receive end, a layout manner of each application on the screen of the receive end is not excessively limited. The layout manner may be selected or set by the skilled person according to an actual requirement. For example, in some optional embodiments, the space region of the screen of the receive end may be equally allocated to applications. In some other optional embodiments, priorities of the applications on the receive end may be sorted in advance, and a relatively large space region is allocated to an application with a high priority. For example, a navigation map is more important than other applications in the vehicle machine. Therefore, a relatively large space region may be preferentially allocated to the navigation map.

S106: The transmit end obtains a drawing instruction and layer data corresponding to the n UI controls, and sends the drawing instruction, the layer data, and the control layout file of the n UI controls to the receive end. The receive end performs an operation in step S108.

S107: The transmit end obtains a drawing instruction and layer data corresponding to the UI controls in the n user experience design elements; and sends the drawing instruction, the layer data, and the control layout file of these UI controls, and element data of the n user experience design elements other than the UI controls to the receive end. The receive end performs an operation in step S109.

The n selected UX elements may include only the UI controls, or may include UX elements such as a video stream, an audio stream, and to-be-notified data at the same time. When the n UX elements include only the UI controls, for the screen projection of these UI controls, the corresponding display interface may be generated through drawing the UI controls after the typesetting and layout at the receive end. When the n UX elements further include other UX elements, the other UX elements need to be output when the UI controls after typesetting and layout are drawn, for example, playing a video stream and an audio stream, and displaying push information.

To ensure that the receive end draws the UI controls after the typesetting and layout, the drawing instruction, the layer data, and the control layout file of the UI controls are all sent to the receive end in this embodiment of this application. The receive end determines a position and a size of each UI control in the application interface of the receive end based on the drawing instruction and the control layout file, draws a contour frame of each UI control, and then, draws content of each UI control based on the layer data, to draw the UI controls after the typesetting and layout. A manner of obtaining the layer data is not limited herein, and may be independently selected or set by the skilled person. For example, in an Android system, the layer data of the UI controls may be obtained by using a SurfaceFlinger component. In addition, a single UI control may correspond to a plurality of layers. In addition, to ensure that the UI control is accurately drawn, the plurality of layers need to be aligned. Therefore, when the single UI control corresponds to the plurality of layers, in this embodiment of this application, a coordinate relationship between these layers is further obtained when the layer data is obtained. The coordinate relationship and the layer data are further both sent to the receive end during screen projection, to ensure that the receive end accurately draws the UI control.

The drawing instruction, the layer data, and the control layout file are not needed for the UX element other than the UI control. Therefore, these UX elements may be sent to the receive end. When the receive end draws the UI control, the receive end outputs the UX element other than the UI control.

S108: The receive end draws the corresponding UI controls on the screen of the receive end based on the received drawing instruction, the received layer data, and the received control layout file of the UI controls, to obtain the corresponding display interface.

Figure 2F:
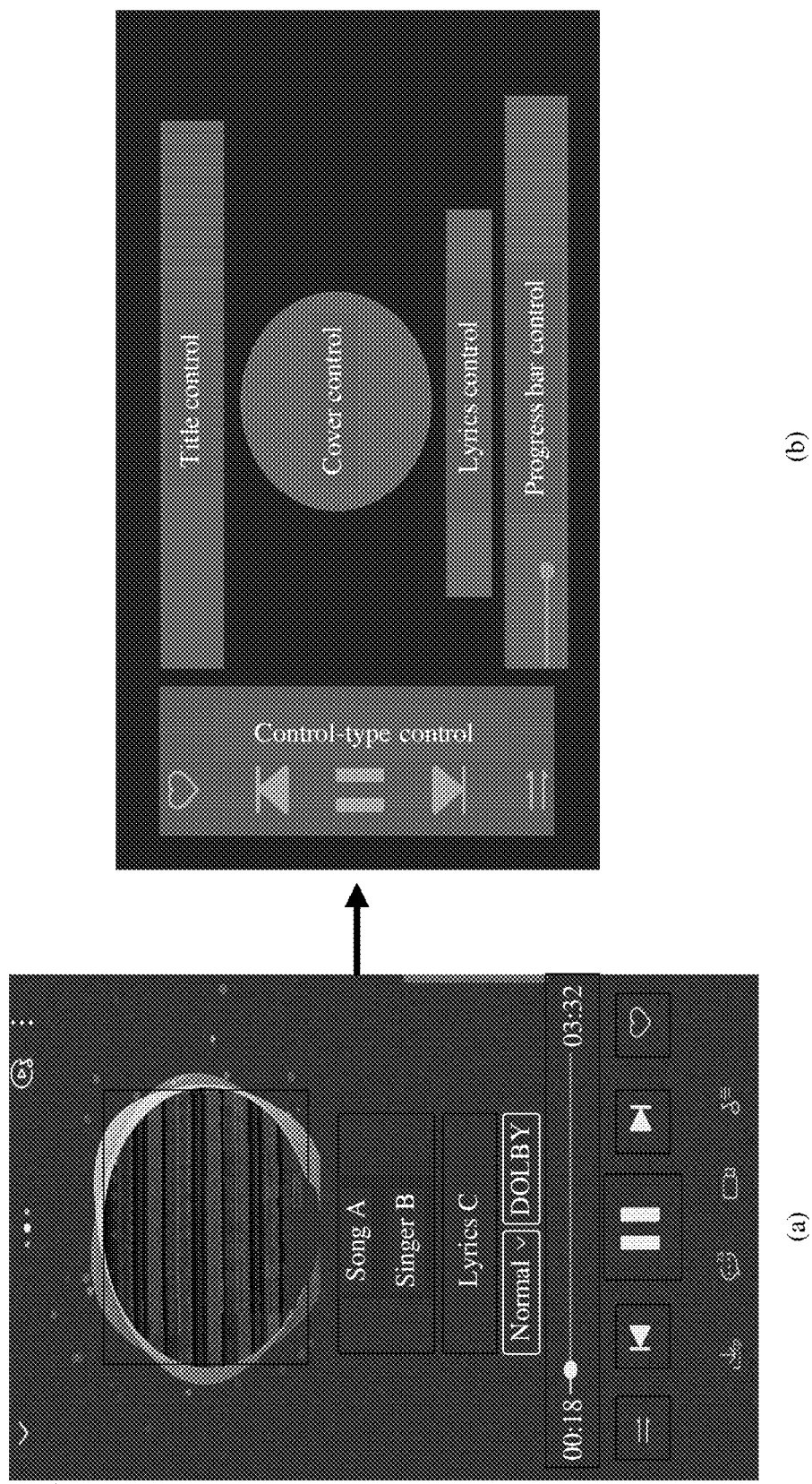
FIG. 2F is a schematic diagram of an application scenario according to an embodiment of this application.

The contour frame of each UI control may be drawn based on the drawing instruction and the control layout file. For example, with reference to FIG. 2F, it is assumed that a part (a) is the real-time interface of the transmit end and includes UI controls such as a title control, a cover control, a singing control, a download control, a comment control, an expansion control, a control-type control (including a play control, a next song control, a previous song control, and a list control), a play mode control, and a progress bar control. It is assumed that only the title control, the control-type control, the cover control, and the progress bar control are reserved after the matching of the UX elements. After drawing is performed based on the drawing instruction and the control layout file, a part (b) in FIG. 2F may be obtained. In this case, each UI control has not content.

Figure 2G:
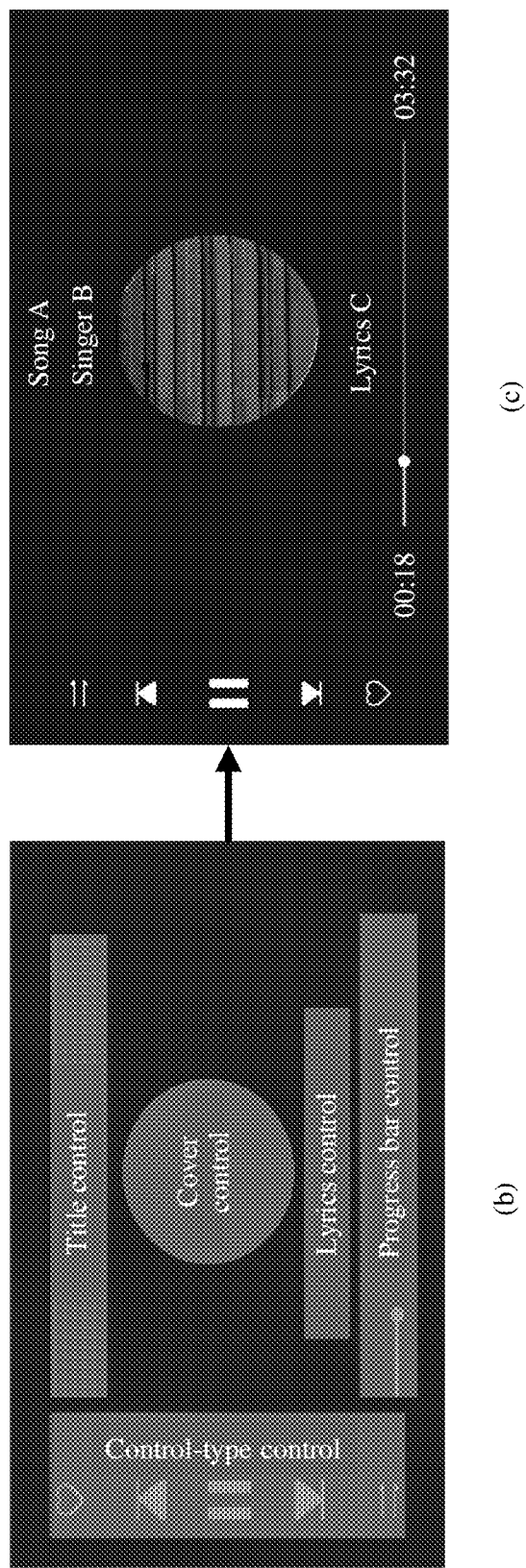
FIG. 2G is a schematic diagram of an application scenario according to an embodiment of this application.

After the contour framework of each UI control is drawn, the content of each UI control is drawn based on the layer data, to draw the UI controls after the typesetting and layout. For example, with reference to FIG. 2G, it is assumed that a part (b) is the part (b) in FIG. 2F. A part (c) is the UI controls obtained after control content is drawn on the part (b) based on the layer data. In this case, rendering of the screen projection interface of the receive end is actually completed, so that the receive end can obtain the corresponding display interface.

To meet a requirement that the receive end normally draws and displays the UI controls in different available screen space regions, in this embodiment of this application, the display interface may be scaled down after the display interface is drawn. The display interface is filled in an available space region on the screen of the receive end. The available space region on the screen of the receive end indicates a screen projection space region that is provided by the receive end for the application on which screen projection is to be performed. The region is less than or equal to an actual total size of the screen of the receive end. A specific size needs to be determined according to an actual application scenario. In this embodiment of this application, a specific filling method of the display interface is not excessively limited. The method may be selected or set by the skilled person according to an actual requirement. For example, the method may be set as follows: covering the entire available space region, or scaling down the display interface with a constant ratio until the display interface has a largest area in the available space region.

S109: The receive end draws the corresponding UI controls on the screen of the receive end based on the received drawing instruction, the received layer data, and the received control layout file of the UI controls, and displays, in layers in a superposing manner, the user experience design elements that need to be displayed, to obtain the corresponding display interface.

Figure 2H:
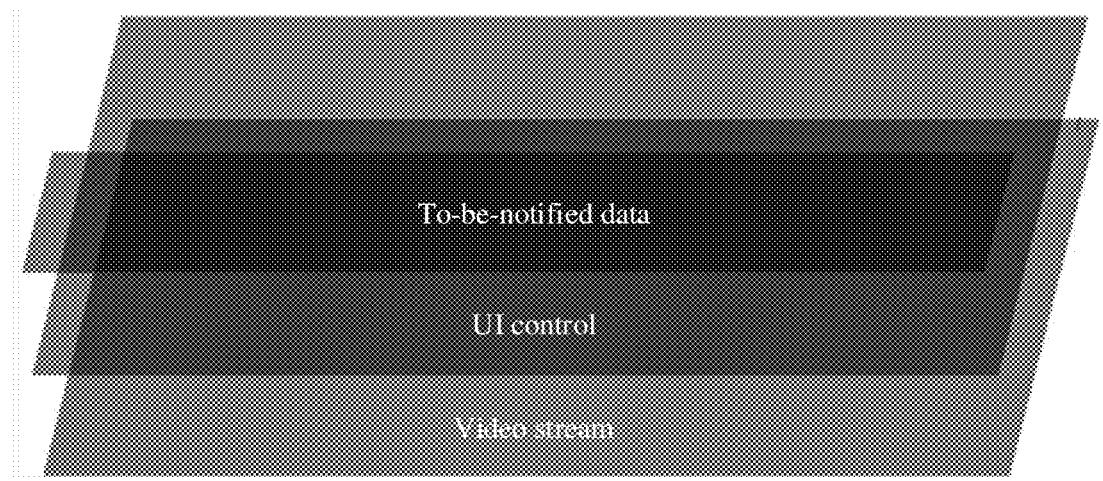
FIG. 2H is a schematic diagram of an application scenario according to an embodiment of this application.

When there are a plurality of UX elements that need to be displayed, in this embodiment of this application, the UX elements are displayed in layers in a superposing manner. With reference to FIG. 2H, in this embodiment of this application, a superposing sequence of the video stream, the UI control, and the to-be-notified data is as follows: The UI control is superposed on the video stream, and the to-be-notified data is superposed on the UI control. Layers corresponding to the UI control and the to-be-notified data both have a transparent background, to ensure normal view of the user for the video stream. The UX element that does not need to be displayed, for example, the audio stream, is directly played by the receive end.

A principle and an operation of drawing the UI control in step S109 are the same as those in step S108. For details, refer to the description in step S108.

Cases of the actually selected UX elements are unknown. The UX elements that do not need to be displayed, for example, an audio stream, do not need to be considered when the receive end draws the application interface. For the UI control, the video stream, and the to-be-notified data that need to be displayed, step S109 may have four selection cases when the UI control already exists. The four cases are respectively as follows:

1. Only the UI control in the UX elements that needs to be displayed is included. In this case, elements other than the UI controls in the n UX elements are all elements that do not need to be displayed, for example, an audio stream.

2. The UX elements include both the UI control and the video stream that need to be displayed.

3. The UX elements include both the UI control and the to-be-notified data that need to be displayed.

4. The UX elements include all of the UI control, the video stream, and the to-be-notified data that need to be displayed.

In the case 1, processing is directly performed in the manner in step S108. In the cases 2, 3, and 4, the UX elements need to be respectively drawn, and are displayed in a superposing manner according to a rule in FIG. 2H.

In step S109, the UX elements are separately drawn and superposed for display, to complete rendering and compositing of the screen projection interface of the receive end, so that the receive end can obtain the corresponding display interface. It should be noted that the to-be-notified data may exist independent of the application on which screen projection is to be performed and does not affect interface layout of the application on which screen projection is to be performed. Therefore, in an actual operation process, a region is usually separately allocated on the display of the receive end to push the to-be-notified data, to ensure that the to-be-notified data can be effectively displayed for the user in time.

Figure 2I:
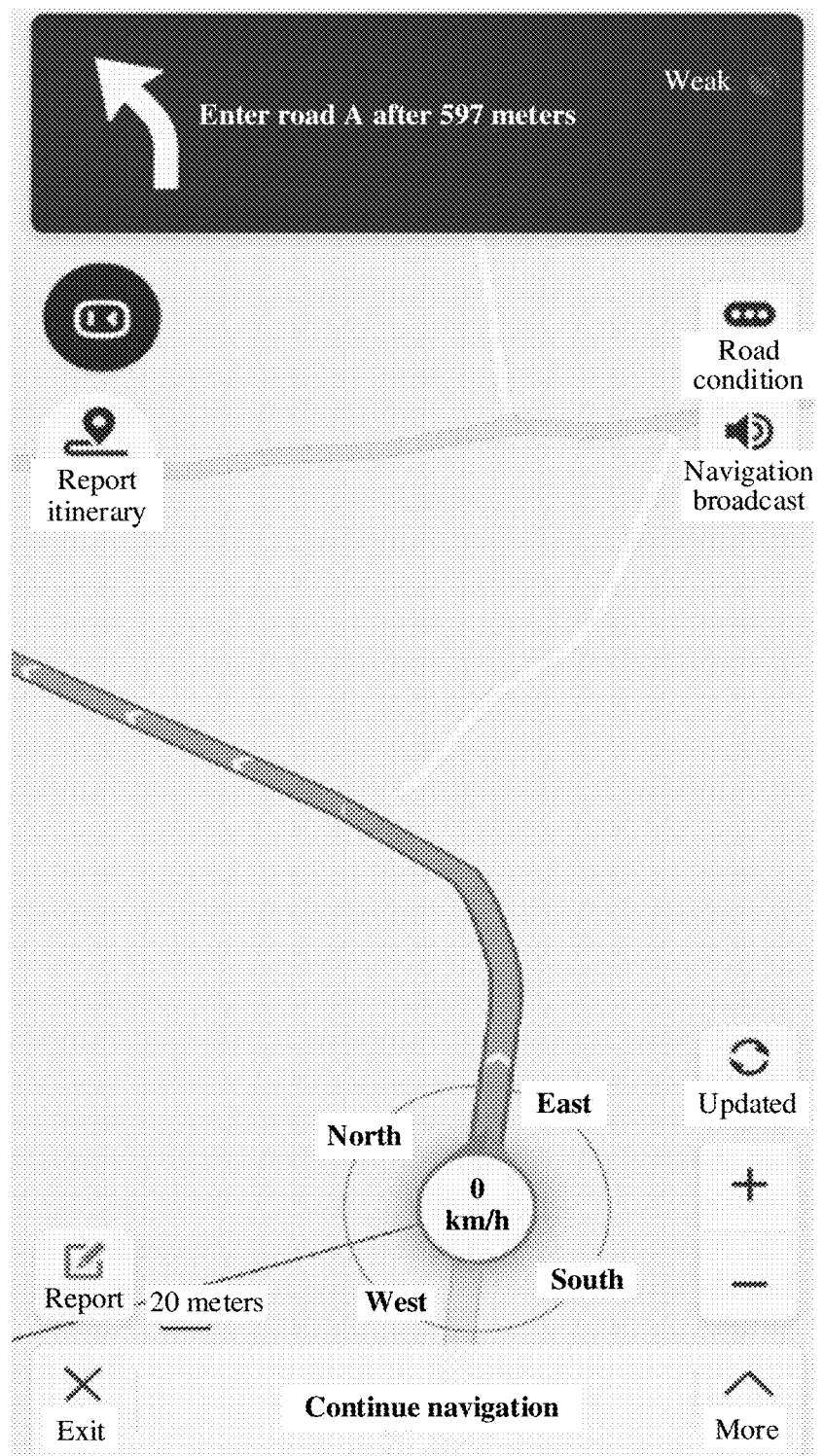
FIG. 2I is a schematic diagram of an application scenario according to an embodiment of this application.

An example is used for description. It is assumed that screen projection needs to be performed on the navigation map, and a real-time map of the navigation map is coded as a video stream. In addition, with reference to FIG. 2I, it is assumed that in this case, the UX elements that can be displayed and on which screen projection needs to be performed include a video stream and a pointer control. In this case, in this embodiment of this application, the pointer control is superposed on the video stream in a manner of a transparent background.

A transmit end with the Android system is used as an example for description. An application like the navigation map has two layers in the SurfaceFlinger component. One layer is a layer in a name starting from "SurfaceView-", and corresponds to an interface of the navigation map. A picture of this layer is obtained in a video manner. The other layer corresponds to a UI control instruction option of the navigation map. The picture of this layer is obtained in a manner of a drawing instruction.

At the receive end, the UI control instruction and the video each are displayed by using a SurfaceView (a view in the Android system). The two SurfaceViews are placed in the same relative layout (RelativeLayout). The SurfaceView of the UI control instruction is at an upper layer and has the transparent background, so that the video layer at a lower layer can be displayed.

In this embodiment of this application, the UI controls are identified and divided for the application on which screen projection is to be performed on the transmit end, and proper UX elements are adaptively matched according to an actual device status of the receive end. Different UX elements may be divided and combined, according to an actual requirement of each receive end, on the application view on which screen projection is to be performed. In addition, in this embodiment of this application, typesetting and rearrangement may be further performed on the UI controls according to the actual case of the receive end. In comparison with a mirroring screen projection for the screen, this embodiment of this application supports independent or combined screen projection at a minimum level of a UX element. There is no need to display all information in the real-time interface of the transmit end. The user may implement more flexible content sharing and interaction on the receive-end device, to improve experience and efficiency that the user uses services of terminal devices across devices. In comparison with a file-based cross-device delivery solution, real-time dynamic data is delivered in this embodiment of this application, and UX elements in one interface may be distributed to a plurality of different receive ends. The screen projection function is rich and more flexible. In comparison with a vehicle machine solution of a customized interface system, in this embodiment of this application, selection, layout, and delivery may be adaptively performed on the UX elements based on features of the UX elements and device features of the receive end in this embodiment of this application. Various different types of vehicle machines may be supported without design involvement of a plurality of developers, to greatly reduce the customization costs of the developers. In addition, an application brand feature may also be greatly maintained based on division, typesetting, and rearrangement of the original UI control, for example, a visual element pattern.

In addition, in this embodiment of this application, a one-to-many screen projection operation may be further implemented for the terminal devices. This embodiment may be compatible with the terminal devices with different operating systems and different system versions. The user can freely set a terminal device object for delivery according to an actual requirement of the user. In this way, the screen projection manner is richer and more flexible, and can meet requirements of more actual scenarios.

The following points are described for the embodiment shown in FIG. 2A-1 and FIG. 2A-2:

1. An Execution Entity for Typesetting and Laying Out the UI Control and Generating the Display Interface of the Receive End May Change to a Certain Extent.

It may be learned from the description of the embodiment shown in FIG. 2A-1 and FIG. 2A-2 that step S105 is typesetting and layout of the UI control. Steps S106 and S107 are transmission of data required for generating the display interface. Steps S108 and S109 are mainly generating the display interface of the receive end. In the foregoing description of the embodiment shown in FIG. 2A-1 and FIG. 2A-2, the transmit end serves as an execution entity to complete operations in steps S101 to S107. However, it is found in actual application that the typesetting and layout of the UI control may also be completed by the receive end. The display interface of the receive end may also be generated by the transmit end. Therefore, execution entities of the operations in steps S105, S108, and S109 may theoretically change. After the execution entities change, solutions that may be obtained are described as follows:

Solution 1: After step S105, the transmit end does not need to send the obtained drawing instruction, the control layout file, the layer data, and the like to the receive end. Instead, the transmit end automatically performs the operation in step S108 or S109. In this case, the transmit end may transmit the generated display interface to the receive end in a manner of a video stream. For the receive end, the obtained video stream is directly decoded and played, to display the screen projection content.

In comparison with the embodiment shown in FIG. 2A-1 and FIG. 2A-2, in the solution 1, the operation of drawing the UX element and the operation of generating the display interface are omitted for the receive end in the solution 1. The receive end only decodes and plays the video stream. In this way, requirements for software and hardware in the receive end are greatly reduced. A screen projection technology in this embodiment of this application may also be compatible with some terminal devices with a relatively weak computing capability. For example, some televisions in old models may also implement a screen projection display function.

Solution 2: After the n UX elements are selected in steps S1041, S1042, S1043, and S1044, the transmit end sends data of each UX element to the receive end. The receive end completes the typesetting and layout operations on the UI control in step S105. The receive end completes the operation of drawing the UX elements and the operation of generating the display interface.

In an actual case, computing resources of the transmit end are usually relatively limited. In particular, when the transmit end performs screen projection on a plurality of terminal devices, a workload of the transmit end is relatively large, and performance of the transmit end is relatively severely affected. Therefore, in the solution 2, after completing matching between the UX element and the receive end, the transmit end sends the matching UX element to the receive end. The receive end is responsible for a subsequent operation. In the solution 2, the workload of the transmit end can be reduced, and the computing resources of the transmit end can be saved. In addition, definition of a video is affected to a certain extent because of operations of coding, decoding, and playing a video. Therefore, in comparison with the solution 1, a final display effect at the receive end in the solution 2 and that in the solution in the embodiment shown in FIG. 2A-1 and FIG. 2A-2 are both improved.

Solution 3: With reference to the solution 1 and the solution 2, after the transmit end selects the n UX elements corresponding to the single receive end, the transmit end determines, based on to a computing resource status of the transmit end and a device status of the receive end, a specific party of a terminal device that completes the typesetting and layout operations on the UI control and the operation of generating the display interface of the receive end. For example, the solution may be set as follows: When the computing resources of the transmit end are sufficient and the computing resources of the receive end are insufficient, the solution 1 is selected for processing. When the computing resources of the transmit end and the computing resources of the receive end are both sufficient, the method in the embodiment shown in FIG. 2A-1 and FIG. 2A-2 is selected for processing. When the computing resources of the transmit end are insufficient but the computing resources of the receive end are relatively sufficient, the solution 2 may be selected for processing.

The receive ends may have independent solution selection processes.

A principle of the typesetting and layout operations on the UI control and a principle of the operation of generating the display interface of the receive end in the solution 1 and the solution 2 are the same as those in the embodiment shown in FIG. 2A-1 and FIG. 2A-2. Therefore, for specific principles and operation details, refer to the description in the embodiment shown in FIG. 2A-1 and FIG. 2A-2. Details are not described herein again.

In this embodiment of this application, an execution entity for laying out the UI control and an execution entity for generating the display interface may be changed to obtain more different screen projection solutions. Each solution can meet a specific application scenario requirement. For example, in the solution 1, requirements for software and hardware in the receive end are reduced. The solution 1 may be compatible with more different types of receive ends. In the solution 2, the computing resources of the transmit end can be saved, to improve device performance of the transmit end and ensure definition of the screen projection. In the solution 3, the solution 1 and the solution 2 can be both considered, to implement extremely high flexibility of screen projection. Therefore, in this embodiment of this application, various application scenarios can be well adapted, to enrich the screen projection function and improve screen projection flexibility.

2. A Refresh Operation is Performed on the Display Interface of the Receive End.

In an actual application program, a change of a display status exists in content of a part of an interface. For example, in some music players, the cover control is constantly rotated. For another example, display content of a motion picture of an application program also changes to a certain extent.

To ensure synchronization between a change of a content display status of the interface of the receive end and the transmit end in a screen projection process, in this embodiment of this application, an update operation is specifically performed based on a type of the display content. A detailed description is as follows:

The display status change of the UI control is actually a change of the attribute data of the UI control. For example, a change of the UI control in color, size, angle, and transparency causes a difference in a display status of the UI control. Therefore, in an optional embodiment of this application, when the operation of drawing the UI control is completed by the receive end, and the attribute data of the UI control changes, the transmit end sends the changing attribute data to the receive end. After receiving the attribute data, the receive end modifies the corresponding status of the UI control. Similarly, when the operation of drawing the UI control is completed by the transmit end, and the attribute data of the UI control changes, the transmit end may update, based on the changing attribute data, the display status corresponding to the UI control, and send the updated drawn UI control to the receive end in a manner such as a video stream.

A display status of a motion picture changes. In an optional embodiment of this application, the operation of drawing the UI control is completed by the receive end. In consideration that the motion picture includes a plurality of pictures, in this embodiment of this application, the transmit end asynchronously sends new picture data to the receive end when the motion picture is drawn. After receiving the picture data, the receive end draws the corresponding picture data.

An example in which the transmit end and the receive end are both devices with the Android system is used for description. A DrawBitmap instruction is generated when the transmit end draws the picture. In this embodiment of this application, the instruction is captured. Hash code corresponding to the picture (used as a unique identifier of the picture) is generated after the instruction is captured. The hash code is cached in the transmit end. Then, the transmit end sends both the DrawBitmap instruction and the hash code to the receive end.

After receiving the DrawBitmap instruction, the receive end searches a cache of the receive end for a picture resource by using the hash code. If the corresponding picture resource is found, drawing is directly performed, to update the motion picture. If the corresponding picture resource is not found, a request is asynchronously sent to the transmit end. After receiving the request, the transmit end finds the corresponding picture resource based on the hash code, and then sends the corresponding picture resource to the receive end. In this case, the receive end caches the picture resource and performs drawing, to update the motion picture. When the receive end has not received the picture resource, a state of the original motion picture may be maintained unchanged, or a preset picture may be drawn, to ensure a visual effect of the motion picture.

In addition to a specific content change that may occur in the application interface, the application interface may also be switched. For example, when the user operates the music player, the interface of the music player may be switched. For example, the song play interface is switched to the song list interface. In an optional embodiment of this application, when a new application interface becomes a real-time interface, the display interface of the receive end may be refreshed in this embodiment of this application. It is assumed that the original real-time interface is a basic interface of the application on which screen projection is to be performed. This embodiment of this application is described in detail as follows:

If the new application interface is not a basic interface, the display interface of the receive end is not refreshed in this embodiment of this application.

If the new application interface is a basic interface, one of the following three strategies may be selected for processing according to an actual requirement: 1. Perform screen projection on the new basic interface to cover an old basic interface. 2. Perform screen projection on the new basic interface but maintain screen projection of an old basic interface. 3. Skip refreshing the display interface of the receive end.

In this embodiment of this application, corresponding refresh solutions are respectively designed for the plurality of refresh cases of the real-time interface of the transmit end. In an actual screen projection process, the receive end may refresh the screen projection content in real time based on the status of the real-time interface of the transmit end, to ensure higher real-time performance and flexibility of the screen projection content in this embodiment of this application.

3. The Receive End May Reversely Control the Transmit End.

In an optional embodiment of this application, to implement man-machine interaction between the receive end and the user and improve user experience, based on the embodiment shown in FIG. 2A-1 and FIG. 2A-2, the execution entity is adjusted to obtain several solutions for implementing screen projection in the embodiment shown in FIG. 2A-1 and FIG. 2A-2. An operation event of the user for the receive end may be further obtained. An application of the receive end is controlled based on the operation event. A detailed description is as follows:

Step a: The receive end detects an event type of the operation event and first coordinate information corresponding to the operation event on the screen of the receive end.

Step b: The receive end performs coordinate conversion on the first coordinate information to obtain second coordinate information of the operation event at the receive end, and sends the event type and the second coordinate information to the transmit end.

Step c: The transmit end executes a corresponding event task based on the second coordinate information and the event type.

A layout of the display interface of the receive end belongs to known data. In addition, a position of the display interface on the screen of the receive end is also known data. Therefore, a conversion relationship between coordinates of the screen of the transmit end and coordinates of the screen of the receive end may be obtained through coordinate calculation and comparison. In this embodiment of this application, the conversion relationship is stored in the receive end. On this basis, when detecting the operation event, the receive end detects the type of the operation event. For example, when an operation event on a touchscreen, a remote control, or a keyboard is detected, it is detected whether a use type is a click operation or a drag operation. In addition, coordinate information of the operation event on the screen of the receive end is further detected and is converted to coordinate information on the screen of the transmit end by using the stored conversion relationship. Finally, the receive end sends both the event type and the coordinate information on the screen of the transmit end to the transmit end.

After receiving the event type and the coordinate information, the transmit end locates, based on the coordinate information, the UI control corresponding to the operation event, then simulates the operation event based on the event type, and executes the corresponding event task. For example, it is assumed that the application on which screen projection is to be performed is the music player, the coordinate information is located at the next-song control, and the event type is a click. In this case, the transmit end performs a corresponding operation to play a next song.

When the transmit end is a device with the Android system, an event task corresponding to the coordinate information may be simulated at the transmit end in an interface InjectInputEvent manner provided in the Android system.

In this embodiment of this application, reverse control of the receive end for the transmit end may be implemented through coordinate conversion and event simulation. The user can also implement an operation on the transmit end without contacting the transmit end in the screen projection process. In this way, efficiency of man-machine interaction between the user and the transmit end is greatly improved, and the screen projection function is richer and more flexible.

4. Interaction Between Different Receive Ends can be Implemented Based on Reverse Control of the Receive End.

It may be learned from the related description of the embodiment shown in FIG. 2A-1 and FIG. 2A-2 that one transmit end in this embodiment of this application may simultaneously perform screen projection to a plurality of receive ends. With reference to the foregoing embodiment in which the receive end performs a reverse control operation on the transmit end, it may be learned that, when a receive end A and a receive end B perform screen projection on content of the same application, if a display interface of the receive end A includes a UI control in a control type, in this case, control on the receive end B may be implemented by using the UI control in the control type in the receive end A, to implement interaction operations between different receive ends.

Figure 3:
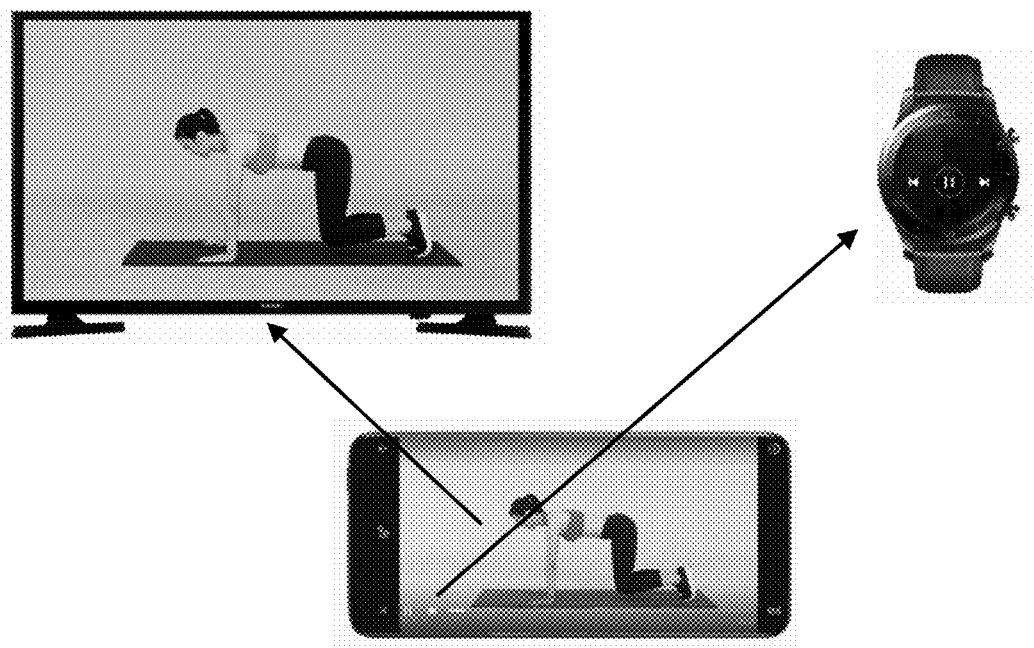
FIG. 3 is a schematic diagram of an application scenario according to an embodiment of this application.

An example is used for description. With reference to the example shown in FIG. 3, the transmit end is a mobile phone, and the receive end is a television and a smart watch. It is assumed that in this example, screen projection is performed on a video stream and a UI control in an information type to the television for display, and screen projection is performed on the UI control in the control type to the smart watch for display. In this example, the user may perform a playing operation on a video in the television through operating controls in the control type such as Previous, Next, and Pause on the smart watch. In this process, the user does not need to perform an operation on the mobile phone or the television, to greatly improve efficiency of man-machine interaction.

Likewise, when more than two receive ends perform screen projection on content of the same application, an interaction operation with another receive end can be implemented as long as the receive end includes a UI control in the control type.

In this embodiment of this application, interaction between different receive ends is implemented based on reverse control of the receive end. The user does not need to perform an operation on the transmit end or the receive end that needs to be controlled. The user can implement control on a target receive end only through performing an operation on the receive end including the UI control in the control type. In an actual screen projection use process of the user, efficiency of man-machine interaction is greatly improved, and user experience is improved.

5. When the Transmit End Performs a Screen Projection Operation, Operations of Terminal Devices May be Independent of Each Other.

In this embodiment of this application, the user can still normally use various services of the transmit end when the transmit end performs screen projection. When there is no conflict between a using service and an application on which screen projection is to be performed, the service of the transmit end used by the user during the screen projection does not affect the screen projection. For example, the transmit end is a mobile phone. In this case, when the screen projection function is enabled, the user can still operate an application related to or unrelated to the screen projection. For example, when screen projection is performed on the music player, the user can still normally perform operations such as making a phone call or accessing a network. In addition, in this embodiment of this application, reverse control of the receive end on the transmit end is supported. It may be learned from the foregoing description of the reverse control principle that the reverse control in this embodiment of this application is implemented based on simulation of an event task. An application on which reverse control does not need to be performed keeps at a foreground of the transmit end. Therefore, each receive end may also perform an independent operation on the application on which screen projection is to be performed. When the receive ends do not affect each other due to the reverse control, operations between the receive ends are independent of each other.

Figure 4:
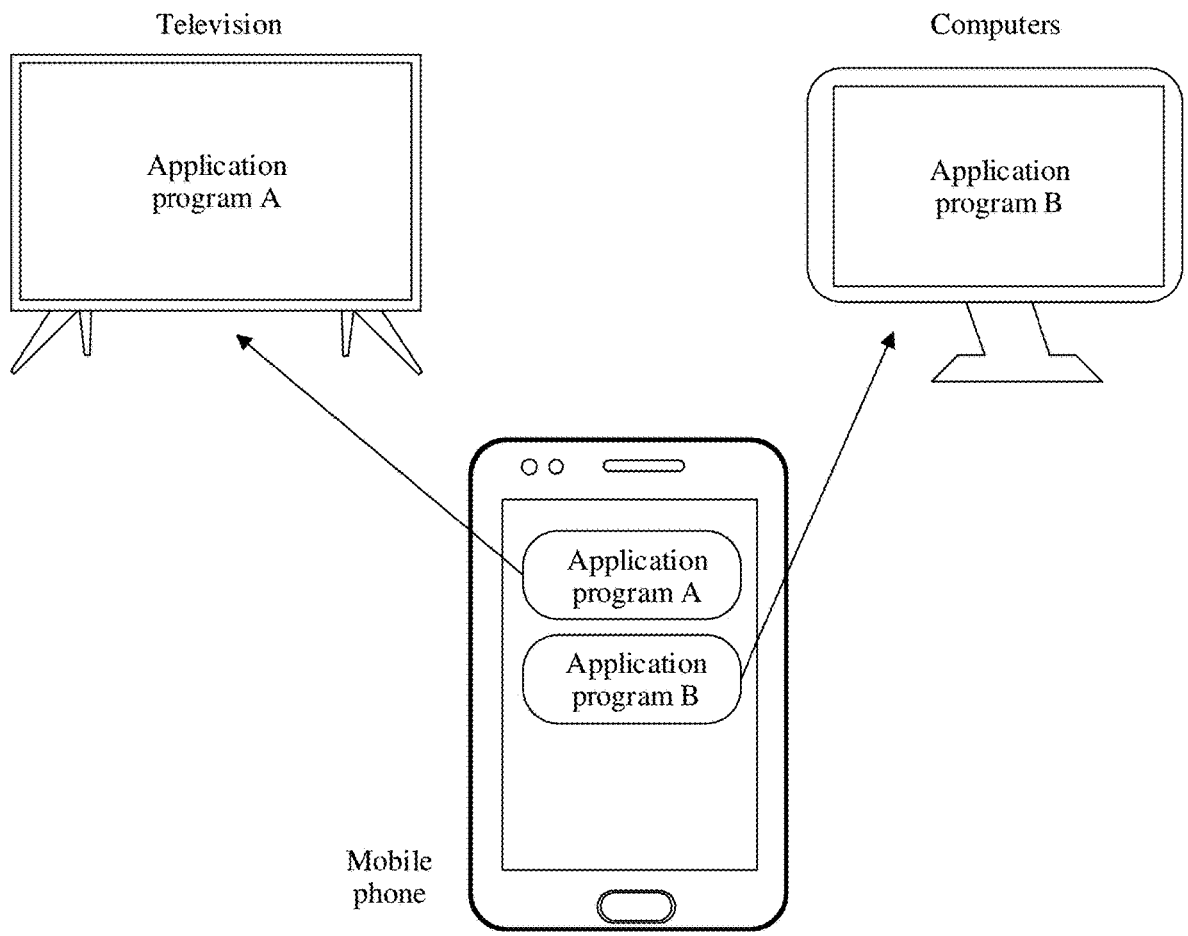
FIG. 4 is a schematic diagram of an application scenario according to an embodiment of this application.

An example is used for description. With reference to the example shown in FIG. 4, the transmit end is a mobile phone, and the receive end is a television and a computer. It is assumed that screen projection is performed on applications of the mobile phone to both the television and the computer. Based on a reverse control mechanism, the user can use a mouse to control an application on which screen projection is to be performed on the computer, and use a remote control to control an application on the television. In this example, the user can normally use a service of the mobile phone, and can also normally use the application on which screen projection is to be performed on the television and the computer. Therefore, the user can simultaneously view different media content such as documents and pictures on a plurality of screens.

In the existing screen projection technology, each receive end can only passively display content based on an interface status of the transmit end. This function is single and inflexible. Therefore, in comparison with the existing screen projection technology, this embodiment of this application can support simultaneous use of a plurality of terminal devices that may not affect each other. Therefore, in this embodiment of this application, the screen projection function is richer and more flexible.

It should be understood that sequence numbers of the foregoing processes do not mean execution sequences in various embodiments. The execution sequences of the processes should be determined according to functions and internal logic of the processes, and should not be construed as any limitation on the implementation processes of embodiments of this application.

It should be further understood that the term "include" used in this specification and the appended claims in this application means presence of features, integers, steps, operations, elements, and/or components, with presence or addition of one or more other features, integers, steps, operations, elements, components, and/or their combinations not excluded.

It should also be further understood that the term "and/or" used in this specification and the appended claims in this application means any combination of one or more of the associated listed items and all possible combinations and includes these combinations.

According to the context, the term "if" used in this specification and the appended claims in this application may be interpreted as a meaning of "when" or "once" or "in response to determining" or "in response to detecting". Similarly, according to the context, the phrase "if it is determined that" or "if (a stated condition or event) is detected" may be interpreted as a meaning of "once it is determined that" or "in response to determining" or "once (a stated condition or event) is detected" or "in response to detecting (a stated condition or event)".

In addition, in the description of this specification and the appended claims in this application, the terms "first", "second", "third", and the like are merely used to distinguish the description, and cannot be construed as indicating or implying relative importance. It should be further understood that although the terms such as "first" and "second" may be used to describe various elements in some embodiments of this application, the elements should not be limited by the terms. The terms are merely used to distinguish one element from another element. For example, a first table may be named a second table, and similarly, a second table may be named a first table, without departing from the scope of the described embodiments. Both the first table and the second table are tables, but are not the same table.

Reference to "an embodiment", "some embodiments", or the like described in this specification in this application indicates that one or more embodiments of this application include specific features, structures, or features described with reference to embodiments. Therefore, statements such as "in an embodiment", "in some embodiments", "in some other embodiments", and "in other embodiments" that appear at different places in this specification do not necessarily mean reference to the same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

The screen projection method in embodiments of this application may be applied to a terminal device such as a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the terminal device is not limited in embodiments of this application.

Figure 5:
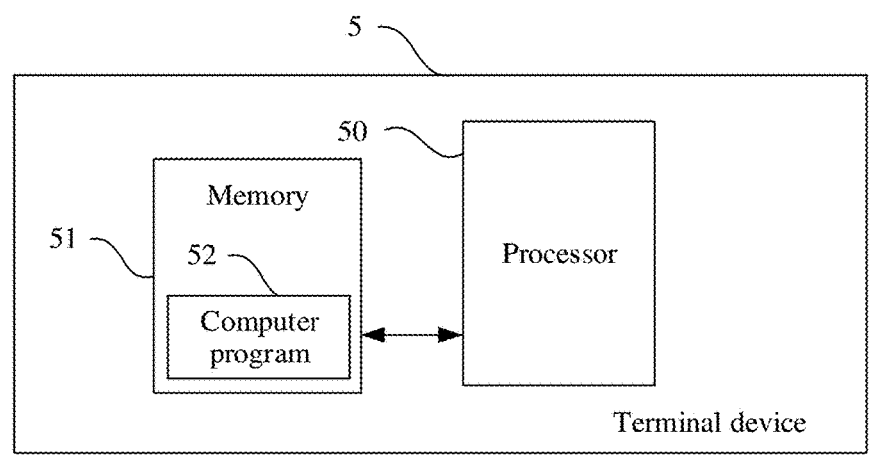
FIG. 5 is a schematic diagram of a structure of a terminal device according to an embodiment of this application.

FIG. 5 is a schematic diagram of a structure of a terminal device according to an embodiment of this application. As shown in FIG. 5, a terminal device 5 in this embodiment includes at least one processor 50 (only one processor is shown in FIG. 5) and a memory 51. The memory 51 stores a computer program 52 that can be run on the processor 50. When executing the computer program 52, the processor 50 implements the steps in the foregoing embodiments of the screen projection method, for example, steps 101 to 109 shown in FIG. 2A-1 and FIG. 2A-2. Alternatively, when executing the computer program 52, the processor 50 implements functions of modules/units in the foregoing apparatus embodiments.

The terminal device 5 may be a computing device such as a mobile phone, a desktop computer, a notebook, a palmtop computer, or a cloud server. The terminal device may include but is not limited to a processor 50 and a memory 51. A person skilled in the art may understand that FIG. 5 is merely an example of the terminal device 5, and imposes no limitation on the terminal device 5. The terminal device 5 may include more or fewer components than those shown in the figure, or may combine some components, or may have different components. For example, the terminal device may further include an input transmit device, a network access device, and a bus.

The processor 50 may be a central processing unit (Central Processing Unit, CPU), or may be another general-purpose processor, a digital signal processor (Digital Signal Processor, DSP), an application specific integrated circuit (Application Specific Integrated Circuit, ASIC), a field programmable gate array (Field-Programmable Gate Array, FPGA), or another programmable logic device, discrete gate or transistor logic device, discrete hardware component, or the like. The general-purpose processor may be a microprocessor, or the processor may be any conventional processor or the like.

In some embodiments, the memory 51 may be an internal storage unit of the terminal device 5, for example, a hard disk or a memory of the terminal device 5. The memory 51 may alternatively be an external storage device of the terminal device 5, for example, a removable hard disk, a smart media card (Smart Media Card, SMC), a secure digital (Secure Digital, SD) card, and a flash card (Flash Card) that are configured on the terminal device 5. Further, the memory 51 may include both the internal storage unit and the external storage device of the terminal device 5. The memory 51 is configured to store an operating system, an application program, a boot loader (BootLoader) program, data, and another program, for example, program code of the computer program. The memory 51 may be further configured to temporarily store data that has been sent or is to be sent.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

An embodiment of this application further provides a computer readable storage medium. The computer readable storage medium stores a computer program. The computer program is executed by a processor to implement steps in the methods in embodiments.

An embodiment of this application provides a computer program product. When the computer program product is run on a terminal device, the terminal device is enabled to perform the steps in the methods in embodiments.

When the integrated module/unit is implemented in the form of a software function unit and sold or used as an independent product, the integrated unit may be stored in a computer readable storage medium. Based on such understanding, all or some of the processes of the methods in embodiments of this application may be completed by a computer program instructing related hardware. The computer program may be stored in a computer readable storage medium. When the computer program is executed by the processor, the steps of the methods in embodiments may be implemented. The computer program includes computer program code. The computer program code may be in a source code form, an object code form, an executable file, some intermediate forms, or the like. The computer readable medium may include any entity or apparatus that can carry the computer program code, a recording medium, a USB flash drive, a removable hard disk, a magnetic disk, an optical disc, a computer memory, a read-only memory (Read-Only Memory, ROM), a random access memory (Random Access Memory, RAM), an electrical carrier signal, a telecommunications signal, a software distribution medium, and the like.

In the foregoing embodiments, the description of each embodiment has respective focuses. For a part that is not described in detail in an embodiment, refer to related descriptions in other embodiments.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A screen projection method, applied to a transmit end and comprising:
    responding, by a transmit end, to a screen projection instruction, and obtaining, by the transmit end, a real-time interface of an application program on which screen projection is to be performed and device information of one or more receive ends;
    obtaining a user experience score of each receive end of the one or more receive ends by scoring a visual effect, a sound effect, and interaction complexity of each receive end based on the device information, to obtain a user experience score of each receive end;
    obtaining, from the real-time interface based on the user experience score, first data on which screen projection is to be performed and that corresponds to each receive end, wherein the first data on which screen projection is to be performed comprises at least one of a video stream, an audio stream, or a user interface control;
    obtaining a control layout file of the user interface control in response to the first data on which screen projection is to be performed comprises comprising the user interface control, obtaining a control layout file of the user interface control; and
    sending, to a corresponding receive end of the one or more receive ends, the first data on which screen projection is to be performed and the control layout file to the corresponding receive end, wherein the first data on which screen projection is to be performed is used by the receive end for data output, and wherein the control layout file is used by the receive end to generate a display interface that comprises the user interface control.

2. The screen projection method according to claim 1, wherein the obtaining, from the real-time interface based on the user experience score, the first data on which screen projection is to be performed and that corresponds to each receive end comprises:
    extracting second data on which screen projection is to be performed and that is comprised in the real-time interface, wherein the second data on which screen projection is to be performed comprises at least one of a video stream, an audio stream, or a user interface control; and
    selecting, based on the user experience score from the second data on which screen projection is to be performed, the first data on which screen projection is to be performed and that corresponds to each receive end of the one or more receive ends.

3. The screen projection method according to claim 2, wherein the device information comprises a size of a display, and further comprises a distortion degree and a frequency response of an audio output; and
    wherein the scoring the visual effect, the sound effect, and the interaction complexity of each receive end based on the device information, to obtain a user experience score of each receive end; and the obtaining, from the real-time interface based on the user experience score, the first data on which screen projection is to be performed and that corresponds to each receive end comprises:
    scoring the visual effect, the sound effect, and the interaction complexity of each receive end based on a size of a display, and a distortion degree and a frequency response of an audio output of the receive end, to obtain the user experience score of each receive end;
    obtaining a corresponding data interaction score by processing each piece of second data on which screen projection is to be performed, to obtain a corresponding data interaction score; and
    obtaining the first data on which screen projection is to be performed and that corresponds to each receive end by performing matching between the user experience score and the data interaction score of each piece of second data on which screen projection is to be performed, to obtain the first data on which screen projection is to be performed and that corresponds to each receive end.

4. The screen projection method according to claim 2, wherein the obtaining the control layout file of the user interface control comprises:
    obtaining the control layout file by performing, based on the device information, typesetting processing on the user interface control in the first data on which screen projection is to be performed, to obtain the control layout file.

5. The screen projection method according to claim 4, further comprising performing, wherein before the sending the first data on which screen projection is to be performed and the control layout file to the corresponding receive end, the method further comprises:
obtaining a drawing instruction and layer data corresponding to each user interface control in the first data on which screen projection is to be performed, wherein the drawing instruction is used to enable the corresponding receive end to draw the user interface control; and
wherein the sending the first data on which screen projection is to be performed and the control layout file to the corresponding receive end comprises:
sending the drawing instruction, the layer data, and the control layout file to the corresponding receive end, wherein the drawing instruction, the layer data, and the control layout file are used by the receive end to draw the user interface control in the generated display interface.

6. The screen projection method according to claim 1 further comprising performing, wherein before the obtaining the real-time interface of an application program on which screen projection is to be performed and device information of the one or more receive ends, the method further comprises:
obtaining a selection instruction input by a user; and
obtaining, based on the selection instruction, the one or more application programs on which screen projection is to be performed.

7. The screen projection method according to claim 2, wherein the extracting second data on which screen projection is to be performed and that is comprised in the real-time interface comprises:
obtaining the real-time interface of the application program on which screen projection is to be performed; and
identifying whether the real-time interface is a preset interface; and
if the real-time interface is the preset interface, extracting, in response to the real-time interface being the preset interface, the second data on which screen projection is to be performed and that is comprised in the real-time interface.

8. The screen projection method according to claim 2, wherein the operation of selecting, based on the user experience score from the second data on which screen projection is to be performed, the first data on which screen projection is to be performed and that corresponds to each receive end comprises:
dividing the video stream and the user interface control in the second data on which screen projection is to be performed into one or more data sets on which screen projection is to be performed, wherein each data set on which screen projection is to be performed is a non-empty not an empty set, and wherein no intersection set exists between the data sets on which screen projection is to be performed;
performing, based on the device information of the receive end, matching on each data set on which screen projection is to be performed; and
using, as the first data on which screen projection is to be performed and that corresponds to the receive end, the second data on which screen projection is to be performed and that is comprised in the successfully matching data set on which screen projection is to be performed.

9. The screen projection method according to claim 4, wherein the obtaining the control layout file by performing, based on the device information, the typesetting processing on the user interface control in the first data on which screen projection is to be performed, to obtain the control layout file comprises:
obtaining size information of the real-time interface and position information and size information of the user interface control in the real-time interface in the second data on which screen projection is to be performed;
drawing, based on the size information of the real-time interface and the position information and the size information of the user interface control in the real-time interface, a distribution diagram corresponding to the user interface control in the real-time interface;
identifying a first typesetting type corresponding to the distribution diagram;
determining, based on the device information, a second typesetting type corresponding to the first typesetting type; and
obtaining, based on the second typesetting type, relative position information and relative size information corresponding to each user interface control in the display interface in the second data on which screen projection is to be performed; and
generating the control layout file based on the relative position information and the relative size information.

10. The screen projection method according to claim 1, further comprising:
receiving second coordinate information and an event type that are sent by a receive end of the one or more receive ends, and executing a corresponding event task based on the second coordinate information and the event type, wherein the event type is obtained through type identification performed on an operation event by the receive end after the operation event is detected, and wherein the second coordinate information is obtained through coordinate conversion processing performed on first coordinate information after the receive end obtains the first coordinate information of the operation event on a screen of the receive end.

11. A terminal device, comprising:
at least one processor; and
a non-transitory memory storing program code for execution by the at least one processor, the program code including instructions to perform:
responding to a screen projection instruction;
obtaining a real-time interface of an application program on which screen projection is to be performed and device information of one or more receive ends;
obtaining a user experience score of each receive end of the one or more receive ends by scoring a visual effect, a sound effect, and interaction complexity of each receive end of the one or more receive ends based on the device information;
obtaining, from the real-time interface based on the user experience score, first data on which screen projection is to be performed and that corresponds to each receive end, wherein the first data on which screen projection is to be performed comprises at least one of a video stream, an audio stream, or a user interface control;

obtaining a control layout file of the user interface control in response to the first data on which screen projection is to be performed comprising the user interface control; and sending, to the corresponding receive end, the first data on which screen projection is to be performed and the control layout file, wherein the first data on which screen projection is to be performed is used by the receive end for data output, and wherein the control layout file is used by the receive end to generate a display interface that comprises the user interface control.

12. The terminal device according to claim 11, wherein the obtaining the first data on which screen projection is to be performed comprises:

extracting second data on which screen projection is to be performed and that is comprised in the real-time interface, wherein the second data on which screen projection is to be performed comprises at least one of a video stream, an audio stream, or a user interface control; and selecting, based on the user experience score from the second data on which screen projection is to be performed, the first data on which screen projection is to be performed and that corresponds to each receive end of the one or more receive ends.

13. The terminal device according to claim 12, wherein the device information comprises a size of a display, and a distortion degree and a frequency response of an audio output; and wherein the scoring the visual effect, the sound effect, and the interaction complexity of each receive end based on the device information, to obtain a user experience score of each receive end; and obtaining, from the real-time interface based on the user experience score, first data on which screen projection is to be performed and that corresponds to each receive end comprises:

scoring the visual effect, the sound effect, and the interaction complexity of each receive end based on a size of a display, and a distortion degree and a frequency response of an audio output of the receive end, to obtain the user experience score of each receive end;

processing each piece of second data on which screen projection is to be performed, to obtain a corresponding data interaction score; and performing matching between the user experience score and the data interaction score of each piece of second data on which screen projection is to be performed, to obtain the first data on which screen projection is to be performed and that corresponds to each receive end.

14. The terminal device according to claim 11, wherein the instructions to perform the obtaining a control layout file of the user interface control include instructions to perform:

performing, based on the device information, typesetting processing on the user interface control in the first data on which screen projection is to be performed, to obtain the control layout file.

15. The terminal device according to claim 14, wherein the instructions further include instructions to perform, before the sending, to the corresponding receive end, the first data on which screen projection is to be performed and the control layout file:

obtaining a drawing instruction and layer data corresponding to each user interface control in the first data on which screen projection is to be performed, wherein the drawing instruction is used to enable the receive end to draw the user interface control; and wherein the instructions to perform the sending the first data on which screen projection is to be performed and the control layout file to the corresponding receive end include the instructions to perform:

sending the drawing instruction, the layer data, and the control layout file to the corresponding receive end, wherein the drawing instruction, the layer data, and the control layout file are used by the receive end to draw the user interface control in the generated display interface.

16. The terminal device according to claim 11, wherein the instructions include instructions to perform, before the obtaining the real-time interface of the application program on which screen projection is to be performed and device information of one or more receive ends:

obtaining a selection instruction input by a user; and obtaining, based on the selection instruction, the one or more application programs on which screen projection is to be performed.

17. The terminal device according to claim 12, wherein the instructions to perform the extracting the second data on which screen projection is to be performed and that is in the real-time interface include instructions to perform:

obtaining the real-time interface of the application program on which screen projection is to be performed and identifying whether the real-time interface is a preset interface; and extracting, in response to the real-time interface being the preset interface, the second data on which screen projection is to be performed and that is in the real-time interface.

18. The terminal device according to claim 12, wherein the instructions to perform the selecting first data on which screen projection is to be performed and that corresponds to each receive end include instructions to perform:

dividing the video stream and the user interface control in the second data on which screen projection is to be performed into one or more data sets on which screen projection is to be performed, wherein each data set on which screen projection is to be performed is a non-empty set, and wherein no intersection set exists between the data sets on which screen projection is to be performed;

performing, based on the device information of the receive end, matching on each data set on which screen projection is to be performed; and using, as the first data on which screen projection is to be performed and that corresponds to the receive end, the second data on which screen projection is to be performed and that is comprised in the successfully matching data set on which screen projection is to be performed.

19. A non-transitory computer readable medium, comprising computer instructions for execution to run on a terminal device, the computer instructions including instructions to perform:

responding to a screen projection instruction, and obtaining a real-time interface of an application program on which screen projection is to be performed and device information of one or more receive ends;

scoring a visual effect, a sound effect, and interaction complexity of each receive end based on the device information, to obtain a user experience score of each receive end of the one or more receive ends;

obtaining, from the real-time interface based on the user experience score, first data on which screen projection is to be performed and that corresponds to each receive end of the one or more receive ends, wherein the first data on which screen projection is to be performed comprises at least one of a video stream, an audio stream, or a user interface control;

obtaining a control layout file of the user interface control in response to the first data on which screen projection is to be performed comprising the user interface control; and sending, to the corresponding receive end, the first data on which screen projection is to be performed and the control layout file, wherein the first data on which screen projection is to be performed is used by the receive end for data output, and the control layout file is used by the receive end to generate a display interface that comprises the user interface control.

20. The non-transitory computer readable medium according to claim 19, wherein the instructions to perform the obtaining the first data on which screen projection is to be performed include instructions to perform:

extracting second data on which screen projection is to be performed and that is in the real-time interface, wherein the second data on which screen projection is to be performed comprises at least one of a video stream, an audio stream, or a user interface control; and selecting, based on the user experience score from the second data on which screen projection is to be performed, the first data on which screen projection is to be performed and that corresponds to each receive end.

* * * * *